United States Patent
Niwa et al.

(10) Patent No.: US 6,696,376 B2
(45) Date of Patent: Feb. 24, 2004

(54) ZIRCONIA CONTAINING CERAMIC BALL, METHOD FOR MANUFACTURING SAME, CERAMIC BALL BEARING AND CHECK VALVE

(75) Inventors: Tomonori Niwa, Ichinomiya (JP); Tetsuji Yogo, Aichi (JP)

(73) Assignee: NGK Spark Plug Co., Ltd. (JP)

( * ) Notice: Subject to any disclaimer, the term of this patent is extended or adjusted under 35 U.S.C. 154(b) by 112 days.

(21) Appl. No.: 09/829,594

(22) Filed: Apr. 10, 2001

(65) Prior Publication Data

US 2001/0039237 A1 Nov. 8, 2001

(30) Foreign Application Priority Data

Apr. 12, 2000 (JP) ........................................ 2000-111304

(51) Int. Cl.⁷ ............................................... C04B 35/48
(52) U.S. Cl. ....................................................... 501/103
(58) Field of Search .................................. 501/102, 103

(56) References Cited

U.S. PATENT DOCUMENTS 4,621,936 A * 11/1986 Hansson et al. ............ 501/103

FOREIGN PATENT DOCUMENTS

| JP | 60-27649 | 2/1985 |
| JP | 62-226859 | 10/1987 |
| JP | 62-235255 | 10/1987 |
| JP | 6-183833 | 7/1994 |
| JP | 11-153142 | 6/1999 |
| JP | 2000-2350 | 1/2000 |
| JP | 2000-74069 | 3/2000 |

* cited by examiner

Primary Examiner—Paul Marcantoni
(74) Attorney, Agent, or Firm—Brinks Hofer Gilson & Lione

(57) ABSTRACT

A zirconia containing ceramic ball is formed of a zirconia containing ceramic material which contains in an amount of not less than 10% by volume the zirconia ceramic phase composed predominantly of zirconium oxide. The size of the largest pore among pores present in a region extending radially from the surface of the ball to a depth of 50 $\mu$m as observed on a polished cross section of the ball taken substantially across the center of the ball is not greater than 3 $\mu$m. The ceramic ball can be manufactured through firing a green body whose relative density is enhanced to not lower than 61% by use of rolling granulation.

14 Claims, 14 Drawing Sheets

FORMING NUCLEI 50

FORMING MATERIAL POWDER 10

130

132

FORMING MATERIAL POWDER LAYER 10k

Fig. 3 (a)  Fig. 3 (b)  Fig. 3 (c)
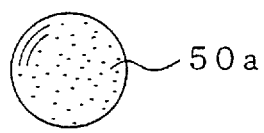 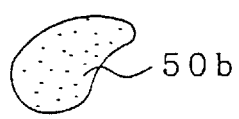 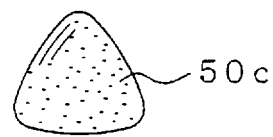
Fig. 3 (d)
Fig. 3 (e)

HOT AIR

HOT AIR $$\text{CUMULATIVE RELATIVE FREQUENCY } n_{rc} = \frac{N_c}{N_o} \times 100 \ (\%)$$

$N_o$: TOTAL FREQUENCY $N_c$: CUMULATIVE FREQUENCY

90% GRAIN SIZE: GRAIN SIZE CORRESPONDING TO $n_{rc}=90\%$

50% GRAIN SIZE: GRAIN SIZE CORRESPONDING TO $n_{rc}=50\%$ $$d = \frac{dmax + dmin}{2}$$

ZIRCONIA CONTAINING CERAMIC BALL, METHOD FOR MANUFACTURING SAME, CERAMIC BALL BEARING AND CHECK VALVE

BACKGROUND OF THE INVENTION

1. Field of the Invention

The present invention relates to a ceramic ball, a method for manufacturing the same, a ceramic ball bearing, and a check valve.

2. Description of Related Art

A ceramic ball exhibits excellent wear resistance as compared with a metallic ball, and is thus used as a ball bearing. For example, Japanese Patent Application Laid-Open (kokai) No. 2000-74069 discloses a bearing including inner and outer rings made of high carbon chromium steel or stainless steel, and zirconia balls serving as rolling elements. According to the disclosed configuration, since the coefficient of linear expansion of the inner/outer ring is substantially equal to that of the zirconia ball, variation in pre-load caused by variation in temperature is reduced. Thus, even when the bearing is applied to precision equipment, such as a hard disk drive for computer use, rotational precision can be maintained high. As disclosed in, for example, Japanese Patent Application Laid-Open (kokai) No. 11-153142, such a zirconia ball bearing is manufactured by the steps of: forming a green body by means of a uniaxial press or a hydrostatic press, the slip casting process, or the injection molding process; subjecting the green body to preliminary firing at atmospheric pressure so as to obtain a relative density of not less than approximately 95%; and subjecting the fired body to hot isostatic pressing (HIP).

In the field of a check valve disposed in a fluid path so as to limit fluid flow within the fluid path to a single direction, a ceramic ball of silicon nitride or like material is used as a valve in equipment for filling bottles and cans with drink and apparatus operating at high speed and high frequency, such as a weft insertion plunger pump for use in a water jet loom.

The unidirectional pressing process is most generally used to form a spherical green body in manufacture of a conventional zirconia bearing ball. However, the process involves a problem in that friction and bridging between a die and powder causes a formed green body to suffer nonuniform density (i.e., nonuniform distribution of pores) and a number of large pores remaining locally. The problem is eased to some extent by means of subsequent cold isostatic pressing. However, complete removal of pores is difficult. A green body formed by means of the slip casting process or the injection molding process is essentially of low density; i.e., pores are much more likely to remain.

According to many patent publications regarding zirconia ceramic, through employment of HIP, large pores remaining in a presintered body are crushed to thereby obtain ceramic of very small pore size. For example, Japanese Patent Application Laid-Open (kokai) No. 62-235255 discloses a zirconia sintered body having a pore size of not greater than 0.1 μm. The techniques disclosed in the publications are not intended for formation of a spherical green body. Thus, the publications do not refer to the results of firing of a spherical green body. Conceivably, the disclosed techniques employ a forming shape, such as rectangular parallelepiped or circular cylinder, that allows uniform pressing in a relatively easy manner and is unlikely to generate a defect. In manufacture of a zirconia ceramic ball for use in, for example, a bearing, the conventional techniques unavoidably encounter the above-mentioned problem of residual pores derived from a forming process and thus fail to yield a sintered body of small pore size even when HIP is employed.

When the above-mentioned conventional techniques are applied to manufacture of ball bearings having a small diameter of not greater than 5 mm for use in a hard disk drive or like apparatus, the following problem will arise. Since the density of a green body formed by means of the conventional techniques becomes lower and more nonuniform, presintering encounters difficulty in attaining a relative density of not lower than 95%. Thus, attainment of a relative density of not lower than 98% is impossible. Hence, a sintered body of small pore size cannot be obtained.

Japanese Patent Application Laid-Open (kokai) No. 2000-2350 discloses a silicon nitride ceramic ball for use as the valve element of a check valve. In order to improve wear resistance, the silicon nitride ceramic ball can be replaced with a zirconia ceramic ball. However, the replacement also unavoidably involves the above-mentioned problem of residual pores derived from a forming process.

SUMMARY OF THE INVENTION

The present invention provides a zirconia containing ceramic ball formed of a zirconia containing ceramic material which contains in an amount of not less than 10% by volume of the zirconia ceramic phase predominantly comprising zirconium oxide. The size of the largest pore (hereinafter called the maximum pore size) among pores present in a region extending radially from the surface of the ball to a depth of 50 μm (hereinafter called the surface layer region) as observed on a polished cross section of the ball taken substantially across the center of the ball is not greater than 3 μm.

The above-mentioned zirconia containing ceramic ball having a maximum pore size of not greater than 3 μm can be manufactured by the following method of the present invention. The method comprises:

a rolling granulation process for obtaining a spherical green body having a relative density of not less than 61%, the rolling granulation process comprising the steps of: preparing a forming material powder which contains in an amount of not less than 10% by volume a zirconia ceramic phase predominantly comprising zirconium oxide; placing the forming material powder in a granulation container; and rolling an aggregate of the forming material powder within the granulation container such that the aggregate grows into a spherical body; and a firing process for firing the spherical green body to obtain a zirconia containing ceramic ball formed of a zirconia containing ceramic material which contains in an amount of not less than 10% by volume a zirconia ceramic phase predominantly comprising zirconium oxide, the maximum pore size among pores present in the surface layer region as observed on a polished cross section of the ball taken substantially across the center of the ball being not greater than 3 μm.

As mentioned previously, in manufacture of a zirconia containing ceramic ball, a green body formed conventionally by means of the uniaxial pressing process or the cold isostatic pressing process contains a number of large pores remaining as pores. The present inventors conducted extensive studies and found that increasing the density of a powder green body to a possible extent and thereby lessening the degree of nonuniform density is important for solving the above-mentioned problem and that imparting a relative density of not less than 61% to a green body is effective for obtaining the above-mentioned green body of low nonuniformity of density. Such a highly dense green body can hardly be manufactured by the pressing process or the cold isostatic pressing (CIP) process but can be easily manufactured by the above-mentioned rolling granulation process. The present inventors found that firing the thus-obtained spherical green body yields the above-mentioned zirconia containing ceramic ball that attains a conventionally unattainable level of pore size; specifically, a maximum pore size of not greater than 3 μm and thus have achieved the present invention. The rolling granulation process exhibits high efficiency in manufacturing a spherical green body and can avoid the problem of providing increased allowance for polishing, since, in contrast with the case of pressing, an unnecessary flange portion is not formed on a green body.

Thus it is an object of the present invention is to provide a zirconia containing ceramic ball of smaller pore size and excellent durability as compared with that manufactured by conventional methods.

It is a further object of the present invention to provide a method of manufacturing a zirconia containing ceramic ball of smaller pore size and excellent durability.

It is a still further object of the present invention to provide a ceramic ball bearing using zirconia containing ceramic balls of smaller pore size and excellent durability.

It is a still further object of the present invention to provide a check valve using a zirconia containing ceramic ball of smaller pore size and excellent durability.

Further objects and advantages of the present invention will become apparent by reference to the following description of the preferred embodiment and appended claims wherein like reference numbers refer to the same component, element or feature.

BRIEF DESCRIPTION OF THE DRAWINGS

FIGS. 3(a), 3(b), 3(c), 3(d) and 3(e) are diagrammatic views showing several examples of a green body.

DESCRIPTION OF THE PREFERRED EMBODIMENT

Figure 1:
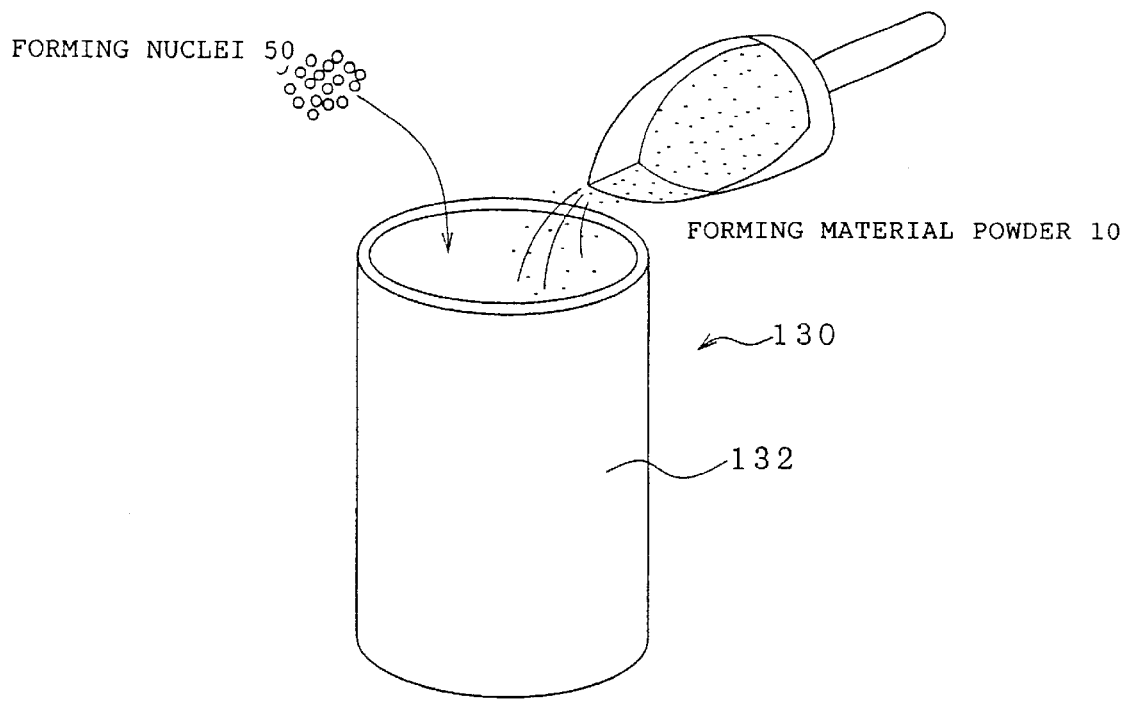
FIG. 1 is a diagrammatic view showing a step of rolling granulation wherein forming nuclei and forming material powder are mixed.

In the present invention, unless otherwise specified, the terms "predominant, "predominantly" and "mainly" used in relation to content mean that the content in % by weight of the component in question is the highest among all components.

The zirconia ceramic phase will be described in detail. $ZrO_2$ and $HfO_2$, which are predominant components of the zirconia ceramic phase, are known to undergo phase transformation, induced by change in temperature, among three different crystal structure phases. Specifically, these compounds assume the monoclinic system phase at low temperature, including room temperature; the tetragonal system phase at higher temperature; and the cubic system phase at further higher temperature. When the entire zirconia ceramic phase consists of at least one of $ZrO_2$ and $HfO_2$, substantially the entirety of the phase is considered to assume the monoclinic system phase at about room temperature. However, when an alkaline earth metal oxide or a rare earth metal oxide (e.g., calcia (CaO) or yttria ($Y_2O_3$)) serving as a stabilizing component is added in a specific amount or more to $ZrO_2$ and $HfO_2$ so as to form solid solution, the temperature of transformation between the monoclinic system phase and the tetragonal system phase is lowered, to thereby stabilize the tetragonal system phase at about room temperature.

The aforementioned phase transformation from the tetragonal system phase to the monoclinic system phase is known to be induced by the Martensitic transformation mechanism or a similar phase transformation mechanism. When external stress acts on the aforementioned tetragonal system phase, the transformation temperature increases, with the result that the tetragonal system phase undergoes stress-induced transformation. In addition, strain energy generated by the stress is consumed to induce the transformation, so that the applied stress is relaxed. Accordingly, in a ceramic microstructure in which particles of the zirconia ceramic phase containing the tetragonal system phase are contained (e.g., dispersed), upon generation of a crack which causes breakage of the microstructure, particles of the above-mentioned zirconia ceramic phase, if remaining in the vicinity of the end of a crack, undergo phase transformation from the tetragonal system phase to the monoclinic system phase due to stress concentrated at the end of the crack. Through this mechanism, the stress concentrated at the end of the crack is relaxed, so that propagation of cracking is stopped or mitigated.

In the zirconia containing ceramic ball according to the present invention, when the constituent ceramic material contains the zirconia ceramic phase in an amount less than 10% by volume, securing sufficient durability becomes impossible when the ceramic ball is to be used as a ceramic ball for a bearing or a check valve. Thus, the zirconia ceramic phase content is preferably 60% by volume or more (including 100% by volume).

The zirconia containing ceramic material preferably has a relative density of 98% or more. When the relative density is 98% or less, sufficient durability cannot be assured. When the zirconia ceramic phase content is less than 10% by volume, elevation of the relative density of the ceramic material to 98% or more may fail to be attained, even when a pressurized sintering method such as hot pressing or HIP is employed. Therefore, the zirconia ceramic phase content is preferably controlled within the aforementioned range, in view of assurance of relative density.

Regarding components for stabilizing the zirconia ceramic phase, one or more species of Ca, Y, Ce, and Mg are preferably incorporated into the zirconia ceramic phase in a total amount of 1.4 to 4 mol % as reduced to oxides; i.e., CaO, $Y_2O_3$, $CeO_2$, and MgO, respectively. When the total amount of the components is less than 1.4 mol %, the monoclinic system phase content increases, to thereby lower the relative tetragonal system phase content. In this case, the aforementioned effect for relaxing stresses cannot be fully attained, and durability (particularly wear resistance) of the ceramic ball might be insufficient. When the total amount of the components is in excess of 4 mol %, the cubic system phase content increases, and, similar to the above case, the durability might be insufficient. Thus, the total amount of the components is preferably 1.5 to 4 mol %, more preferably 2 to 4 mol %.

Specifically, in the present invention, $Y_2O_3$ is preferably used as the component for stabilizing the tetragonal system phase, since $Y_2O_3$ is comparatively inexpensive, and a ceramic material produced by use thereof can be endowed with high mechanical strength as compared with the case in which a ceramic material is produced by use of other stabilizing components. When CaO or MgO is used, a ceramic material produced by use thereof can be endowed with comparatively high mechanical strength, which, however, is lower than that attained by use of $Y_2O_3$. In addition, CaO and MgO are more inexpensive than $Y_2O_3$. Thus, CaO and MgO are also preferably used in the present invention. $Y_2O_3$, CaO, and MgO may be used singly or in combination of two or more species.

$ZrO_2$ and $HfO_2$—predominant components of the zirconia ceramic phase—are similar to each other in terms of chemical and physical properties. Thus, these two components may be used singly or in combination. More preferably, however, ceramic particles are formed predominantly of $ZrO_2$, which is inexpensive as compared with $HfO_2$. In many cases, generally available $ZrO_2$ raw material of standard purity contains a trace amount of $HfO_2$. However, for the aforementioned reason, intentional removal of $HfO_2$ before use of such a raw material is unnecessary.

In the zirconia ceramic phase, the ratio of the weight of the cubic system phase (CW) to that of the tetragonal system phase (TW); i.e., CW/TW is preferably less than 1. The cubic system phase is prone to be generated when the temperature of transformation between the cubic system phase and the tetragonal system phase is lowered due to an increase in amount of the aforementioned stabilizing component or when the firing temperature is in excess of 1600° C. As compared with the monoclinic system phase and the tetragonal system phase, the cubic system phase tends to generate coarsening crystal grains during firing. The thus-coarsened crystal grains in the cubic system phase easily drop off, because interfacial bonding strength to other crystal grains is low. Furthermore, if the amount of the cubic system phase increases to such a level that the aforementioned ratio exceeds 1, the amount of such coarsened crystal grains increases accordingly. In either case, the durability of ceramic balls is impaired. Accordingly, the ratio CW/TW is controlled to less than 1, preferably less than 0.5, more preferably less than 0.1.

The information in relation to the ratio of the tetragonal system phase to the cubic system phase is obtained in the following manner. For example, a portion of the constituent ceramic of a ball is mirror-polished, and the thus-polished surface is investigated through X-ray diffractometry. In this case, the main diffraction peaks; i.e., that attributed to (1 1 1), of the tetragonal system phase and that of the cubic system phase, are observed in the obtained diffraction pattern such that the two peaks are close to each other. Therefore, initially, the amount of the monoclinic system phase is obtained from the ratio of the total intensity of (1 1 1) intensity and (1 1 −1) intensity (Im) to the sum of (1 1 1) intensity of the tetragonal system phase and that of the cubic system phase (It+Ic). Subsequently, the sintered ceramic material is mechanically crushed, and the crushed matter is again subjected to X-ray diffractometry, to thereby obtain (1 1 1) intensity I'm of the monoclinic system phase and (1 1 1) intensity I'c of the cubic system phase. Due to mechanical stress generated during the above crushing process, the tetragonal system phase of the sintered ceramic material is considered to be transformed to the monoclinic system phase. Thus, the amount of the cubic system phase can be obtained from the ratio, I'c/(I'm+I'c). The thus-obtained ratio I'c/(I'm+I'c) is 0.5 or less, preferably 0.1 or less, in view of enhancement of durability of ceramic balls.

The ceramic material which constitutes the ceramic ball may be formed of a composite ceramic material comprising the zirconia ceramic phase and the ceramic phase serving as the balance (hereinafter may be referred to as the balance ceramic phase) and predominantly containing alumina and/or an electrically conductive inorganic compound whose metallic cationic component is at least one of Hf, Mo, Ti, Zr, Nb, W, and Si. For example, when alumina is incorporated into the balance ceramic phase, the mechanical strength of zirconia containing ceramic material can be remarkably enhanced and the durability of the ceramic ball can be enhanced considerably. In this case, in order to fully assure the effect for enhancing the mechanical strength through incorporation of alumina, preferably, the zirconia ceramic phase content is controlled to 10 to 80% by volume and the content of the balance ceramic phase predominantly containing alumina is controlled to 10 to 80% by volume.

When an electrically conductive inorganic compound is incorporated into the balance ceramic phase, electrical conductivity can be imparted to the zirconia containing ceramic material, whereby electrification of balls can be prevented or suppressed effectively. This solves the problem involved in production of balls of small diameter such that the balls adhere to an apparatus (e.g., a container), thereby hindering smooth progress of the production process. Further, when the ball is used in precision electronic equipment, such as a hard disk drive for a computer which is operated at high rotational speed, adhesion of foreign substance to the ball due to electrification and resultant generation of abnormal noise and vibration can be prevented or suppressed effectively. For example, even when the bearing of the present invention is used at high rotational speed (e.g., 5400 to 15,000 rpm) in such precision electronic equipment, long service life can be secured.

The electrically conductive inorganic compound phase may be formed of an electrically conductive inorganic compound which contains as a cationic component at least one element selected from among Hf, Mo, Ti, Zr, Nb, W, and Si. Since these electrically conductive inorganic compounds have good electrical conductivity, relatively high hardness, and excellent durability, they can be preferably used as the constituent ceramic of the ceramic ball for a bearing of the present invention. The electrically conductive inorganic compound may consist of at least one member selected from among metal nitrides, metal carbides, metal borides, metal carbide nitrides, each containing as a metallic cationic component at least one element selected from among Hf, Mo, Ti, Zr, Nb, and Ta, tungsten carbide, and silicon carbide. Specifically, examples of the electrically conductive inorganic compound include titanium nitride, titanium carbide, titanium boride, tungsten carbide, zirconium nitride, titanium carbide nitride, silicon carbide, and niobium carbide. Moreover, the electrically conductive inorganic compound phase may be an electrically conductive oxide. Specific examples of the electrically conductive oxide include a titanium oxide (e.g., $TiO_2$), a tin oxide ($SnO_2$), copper oxide ($Cu_2O$), chromium oxide ($Cr_2O_3$), and nickel oxide (NiO). In order to realize both the electrical conductivity and strength of the constituent ceramic, preferably, the zirconia ceramic phase content is controlled to 10 to 80 vol. % and the content of the aforementioned electrically conductive inorganic compound phase is controlled to 15 to 70 vol. %.

A preferred mode for carrying out the rolling granulation process will next be described.

The rolling granulation process can easily manufacture a highly dense, homogeneous green body of high sphericity having a small diameter of not greater than 14 mm, particularly, not greater than 7 mm (for example, 2 to 5 mm), which can hardly be manufactured by means of the conventional pressing process. Through firing the green body, a zirconia containing ceramic ball having a diameter of not greater than 12 mm, particularly not greater than 5 mm (for example, 1.5 to 4 mm), and a maximum pore size falling within the aforementioned range (not greater than 3 $\mu$m) can be manufactured at high efficiency.

A spherical green body of high density can be obtained through employment of the method in which a forming material powder is caused to adhere to a green body in process of rolling granulation while liquid predominantly comprising a liquid forming medium is supplied. The liquid forming medium can be, but is not limited to, an aqueous solvent; specifically, water or an aqueous solution prepared through addition of an appropriate additive to water. For example, the liquid forming medium may be an organic solvent. Conceivably, the method yields the following effect: when the liquid forming-medium and the forming material powder adhere to pits and projections present on the surface of a green body, the osmotic pressure of the liquid forming medium causes powder particles to adhere to the green body while being densely arrayed, to thereby enhance the density of the green body. In order to enhance the effect, preferably, the liquid forming medium is sprayed directly over the green body. Spraying the liquid forming medium may extend over the entire forming process (for example, the entire rolling granulation process) or over a portion (for example, the end stage) of the forming process. Also, the liquid forming medium may be supplied continuously or intermittently.

Figure 12:
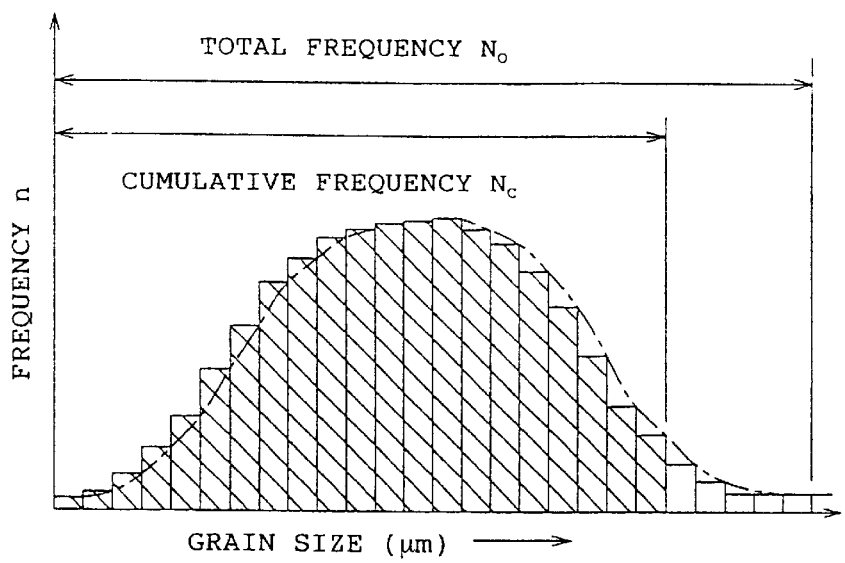
FIG. 12(a) is a graph showing the relationship between grain size and relative frequency.
FIG. 12(b) is a graph showing the relationship between grain size and cumulative relative frequency.
Figure 12:
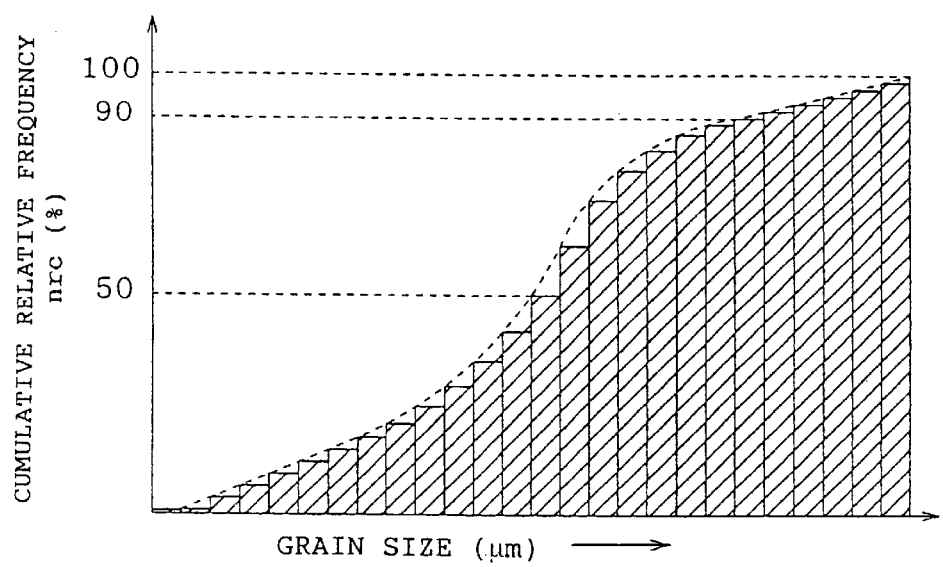

Herein, the cumulative relative frequency with respect to grain size as measured in the ascending order of grain size is defined in the following manner. As shown in FIG. 12, frequencies of grain sizes of particles to be evaluated are distributed in the ascending order of grain size. In the cumulative frequency distribution of FIG. 12, Nc represents the cumulative frequency of grain sizes up to the grain size in question, and NO represents the total frequency of grain sizes of particles to be evaluated. The relative frequency nrc is defined as "(Nc/NO)×100 (%)." The X% grain size refers to a grain size corresponding to nrc=X(%) in the distribution of FIG. 12. For example, the 90% grain size is a grain size corresponding to nrc=90(%).

Figure 16:
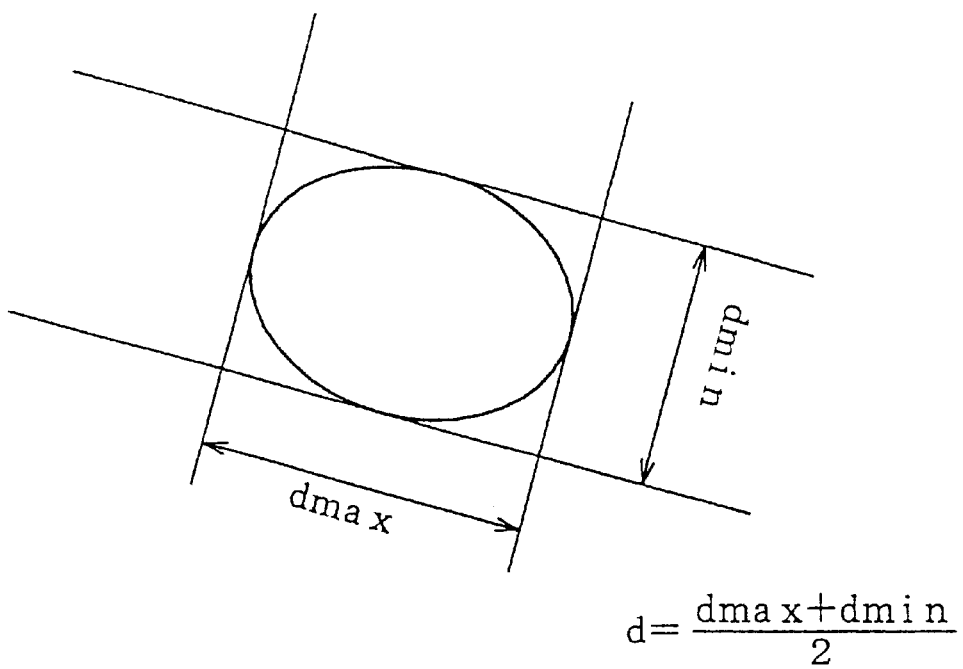
FIG. 16 is a diagrammatic view showing the definition of the size d of a pore.

The size of a crystal grain or a defect is defined in the following manner. As shown in FIG. 16, various parallel lines circumscribe a crystal grain or a defect which is observed on the microstructure of a polished surface by means of SEM or like equipment. The size of the crystal grain or defect is represented with an average value of the minimum distance dmin between such parallel lines and the maximum distance dmax between such parallel lines (i.e., size d=(dmin+dmax)/2).

A forming material powder which can be effectively used in the rolling granulation process has an average grain size of 0.3 to 2 $\mu$m and a 90% grain size of 0.7 to 3.5 $\mu$m as measured by use of a laser diffraction granulometer and a BET (an acronym representing originators, Brunauer, Emett and Teller) specific surface area of 5 to 13 $m^2$/g.

By use of a forming material powder having an average grain size and a 90% grain size, as measured by use of a laser diffraction granulometer, falling within the above-mentioned ranges and a BET specific surface area falling within the above-mentioned respective ranges, a formed green body becomes unlikely to suffer nonuniform density or discontinuous boundaries which-would otherwise result from biased distribution of powder particles, thereby drastically reducing fraction defective with respect to deformation, cracking, or chipping in manufacture of a sintered body. The present invention has been achieved on the basis of these findings. The measuring principle of a laser diffraction granulometer is publicly known. Briefly, sample powder is irradiated with a laser beam. A beam diffracted by powder particles is detected by means of a photodetector. The scattering angle and the intensity of the diffracted beam are obtained from the data detected by the photodetector. The grain size of the sample powder can be obtained from the scattering angle and the intensity.

Figure 11:
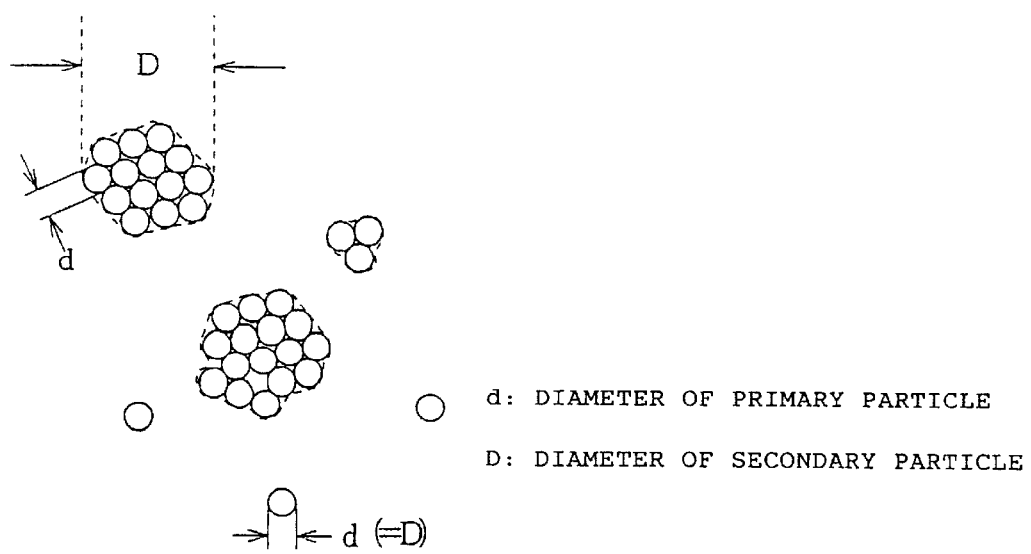
FIG. 11 is a diagrammatic view showing the diameter of a primary particle and the diameter of a secondary particle.

The forming material powder, which is composed of ceramic material, often contains secondary particles, as shown schematically in FIG. 11. Various factors, such as the action of an added organic binder and an electrostatic force, cause a plurality of primary particles to aggregate into a secondary particle. In measurement by use of a laser diffraction granulometer, an aggregate particle and a solitary primary particle do not exhibit much difference in the diffracting behavior of an incident laser beam. Accordingly, whether a measured grain size is of a solitary primary particle or of an aggregate secondary particle is not definitely known. That is, the thus-measured grain size reflects the diameter of a secondary particle D shown in FIG. 11 (in this case, a solitary primary particle is also considered to be a secondary particle as defined in a broad sense). An average grain size or 90% grain size calculated from the measured grain size reflects an average grain size or a 90% grain size with respect to secondary particles.

The specific surface area of the forming material powder is measured by the adsorption method. Specifically, the specific surface area can be obtained from the amount of gas adsorbed on the surface of powder particles. According to general practice, an adsorption curve indicative of the relationship between the pressure of gas to be measured and the amount of adsorption is obtained through measurement. The known BET formula related to polymolecular adsorption is applied to the adsorption curve so as to obtain the amount of adsorption vm upon completion of a monomolecular layer. A BET specific surface area calculated from the obtained amount of adsorption vm is used as the specific surface area of the powder. However, when approximation does not make much difference, the amount of adsorption vm of the monomolecular layer may be read directly from the adsorption curve. For example, when the adsorption curve contains a section in which the pressure of gas is substantially proportional to the amount of adsorption, the amount of adsorption corresponding to the low-pressure end point of the section may be read as the vm value (refer to the monograph by Brunauer and Emett appearing in The Journal of American Chemical Society, Vol. 57 (1935), page 1754). Since molecules of adsorbed gas penetrate into a secondary particle to thereby cover individual constituent primary particles of the secondary particle, the specific surface area obtained by the adsorption method reflects the specific surface area of a primary particle and thus reflects the average value of the diameter of a primary particle shown in FIG. 11.

In order to obtain a sintered body that has sufficiently high density and strength with few defect, the above-mentioned forming material is prepared in such a manner as to have a relatively small BET specific area of 5 to 13 $m^2/g$, which reflects the diameter of a primary particle. An important point is that the forming material powder is prepared to have an average grain size or a 90% grain size, which is measured by use of a laser diffraction granulometer and which reflects the diameter of a secondary particle, as small as about $\frac{1}{10}$ or less that of a forming material powder obtained by means of the spray-drying process; i.e., an average grain size of 0.3 to 2 $\mu$m, or a 90% grain size of 0.7 to 3.5 $\mu$m. This indicates that the forming material powder is unlikely to suffer nonuniform aggregation with respect to secondary particles and associated nonuniform distribution density of particles. Thus, through employment of the above-mentioned range of grain size, a formed green body becomes unlikely to suffer biased distribution of powder particles.

When the average grain size of the forming material powder is in excess of 2 $\mu$m, or the 90% grain size is in excess of 3.5 $\mu$m, a formed green body becomes likely to suffer biased distribution of powder particles, potentially causing a sintered body to suffer nonuniform contraction with resultant deformation, cracking, or chipping of the sintered body. Meanwhile, the forming material powder having the above-mentioned average grain size of less than 0.3 $\mu$m or a 90% grain size of less than 0.7 $\mu$m requires a considerably long preparation time (for example, a considerably long pulverization time), resulting in increased manufacturing cost due to impaired manufacturing capability. Preferably, the average grain size of the forming material powder is 0.3 to 1 $\mu$m, and the 90% grain size is 0.7 to 2 $\mu$m.

When the BET specific surface area of the forming material powder is less than 5 $m^2/g$, the diameter of a primary particle becomes excessively large, causing nonuniform sintering. As a result, an obtained spherical sintered body suffers pores with a resultant impairment in strength. Meanwhile, the forming material powder having a BET specific surface area in excess of 13 $m^2/g$ requires a considerably long preparation time (for example, a considerably long pulverization time), resulting in increased manufacturing cost due to impaired manufacturing capability. Preferably, the BET specific surface area of the forming material powder is 5 to 10 $m^2/g$.

The process for preparing the above-mentioned forming material powder may include, for example, a slurry preparation step, a drying step, and a collection step. In the slurry preparation step, ceramic powder, sintering aid powder, and solvent are mixed to thereby prepare slurry. In the drying step, an aggregation of granular or agglomerate drying media of ceramic or metal is disposed at an intermediate position of a hot air passage such that the drying media can flow or vibrate within a predetermined spatial range; hot air is passed through the drying media aggregate so as to cause the drying media to flow or vibrate within the spatial range; and the slurry is fed to the flowing or vibrating drying media so that the slurry is mixed with the drying media to thereby evaporate the solvent and thus yield the forming material powder. In the collection step, the thus-obtained forming material powder is conveyed, by means of the hot air, toward a position located downstream of the drying media aggregate, whereby the forming material powder is collected.

According to the above-mentioned method, the slurry is fed to the drying media aggregate, and the fed slurry is dried by means of hot air to become powder. The thus-formed powder adheres to the surface of each drying medium to form a powder aggregate layer. The flow of hot air causes flowing or vibration of drying media on which the powder aggregate layer is formed. Thus, the individual pieces of drying media collide or rub against each other. The powder aggregate layers adhering to the surfaces of the drying media are pulverized. The thus-pulverized masses are blown off by hot air while aggregation is being loosened, and then collected. This method can yield, readily and at high efficiency, the forming material powder of a grain size falling within the above-mentioned range. Ceramic media are preferred as the drying media because of their resistance to wear. The ceramic media may be formed predominantly of, for example, alumina, zirconia, or a mixture thereof. Such ceramic media has an advantage in that, even when wear particles thereof mix into the material powder, they serve as a sintering aid component, thereby minimizing the influence of mixing into the material powder.

The hot air passage, where the drying step is performed in the above-mentioned process for preparing the forming material powder, may include a hot air duct disposed vertically. The hot air duct includes a drying media holder, which is located at an intermediate position of the hot air duct and includes a gas pass body, such as mesh, adapted to permit passage of hot air and adapted not to permit passage of the drying media. The slurry can be fed, from above through effect of gravity, to the drying media aggregate held on the drying media holder. Hot air is allowed to flow through the hot air duct upward from underneath the drying media aggregate while agitating the drying media. The dried powder is conveyed through the hot air duct by means of hot air and is then collected in a downstream collector.

According to the above-described method, the drying media are blown up and agitated by hot air supplied from underneath and fall on the drying media aggregate. The drying media undergo this cycle of motion repeatedly, thereby exerting impact on powder aggregate layers formed on the drying media, efficiently and in a relatively uniform manner. Among thus-pulverized aggregate particles, coarse particles are not blown off by hot air but fall again on the drying media aggregate and undergo pulverization, thereby suppressing generation of coarse secondary particles which might cause biased distribution of powder within a green body formed in the subsequent forming process.

Preferably, rolling granulation is performed by the steps of placing the forming material powder and forming nuclei in a granulation container; and rolling the forming nuclei within the granulation container so as to cause the forming material powder to adhere to and aggregate on the forming nuclei spherically, thereby yielding spherical green bodies. The forming nuclei roll on, for example, a forming material powder layer within the granulation container such that the forming material powder adheres to and aggregates on the forming nuclei spherically, to thereby yield spherical green bodies. This forming process greatly enhances the density of an aggregate layer of the forming material growing on a forming nucleus, and yields the effect that the formed aggregate layer becomes unlikely to suffer pores, such as pores or cracks, which would otherwise result from, for example, bridging of powder particles. Notably, rotating the granulation container is a simple method for rolling forming nuclei (or growing green bodies). However, for example, through utilization of a principle similar to that of a vibration type barrel polishing apparatus, vibration may be applied to the granulation container so as to excite rolling of the forming nuclei through vibration.

In this case, a ceramic ball obtained through firing has a core portion formed at a central portion in a distinguishable manner from an outer layer portion as observed on a cross section taken substantially across the center of the ball. Herein, the term "distinguishable" encompasses not only a visually distinguishable case but also a case where the core portion is distinguishable from the outer layer portion through measurement of difference in certain physical properties (for example, density and hardness).

Through attainment of the above microstructure of a sintered body, a ceramic ball exhibits high density, high hardness and low fraction defective at a surface layer portion, which is a key to enhancement of performance of, for example, a bearing. Specifically, through firing of the above-mentioned spherical green body manufactured by the method of the present invention, an obtained ceramic ball is, for example, such that a core portion derived from a forming nucleus is formed at a central portion of the ball distinguishably from an outer layer portion derived from an aggregate layer, which is highly dense and contains few pores, when a polished cross section taken substantially across the center of the ball is observed in an enlarged manner.

A green body may be fired by means of the atmospheric sintering process, the hot pressing process, the hot isostatic pressing (HIP) process, or a like process. Alternatively, these processes may be combined in various ways. For example, a green body may undergo atmospheric sintering for preliminary firing, followed by hot isostatic pressing. The firing temperature is 1300° to 1900° C., preferably 14000 to 1600° C. As a result of firing at the above temperature a green body to which an enhanced relative density of not lower than 61% is imparted by means of the above-described rolling granulation process, a ball obtained through firing can exhibit a maximum pore size of not greater than 3 $\mu$m in the surface layer region, even though the green body is spherical. The HIP process enables firing in an inert gas atmosphere having a pressure of 100 to 2000 atmospheres. The HIP process can reduce the maximum pore size to not greater than approximately 2 $\mu$m, further to not greater than approximately 1 $\mu$m.

As a result of firing at the above temperature, a green body to which an enhanced relative density of not lower than 61% is imparted by means of the above-described rolling granulation process, a ball obtained through firing can exhibit a value of not greater than 1% in the cumulative area percentage of pores each having a size of not less than 1 $\mu$m as observed in the surface layer region. A zirconia containing ceramic ball in which the cumulative area percentage of pores each having a size of not less than 1 $\mu$m is reduced to the above low level is used as, for example, a bearing ball or the valve element of a check valve, to thereby greatly enhance the durability of the bearing or the check valve.

Application of the zirconia containing ceramic ball of the present invention to a bearing ball will next be described. A ball bearing can be configured such that a plurality of zirconia containing ceramic balls of the present invention are incorporated between an inner ring and an outer ring so as to serve as rolling elements. The thus-configured ball bearing can be favorably used as, for example, a bearing component of a rotating shaft section of a hard disk, which serves as a magnetic storage medium. Specifically, a hard disk drive can comprise the above ball bearing; a drive unit for rotatively driving a member (hereinafter called the rotational member) attached to either of the outer ring and the inner ring of the ball bearing, whichever serves as a rotational ring while the other serves as a stationary ring; and a hard disk which rotates integrally with the rotational member. Even in the manufacture of a bearing ball having a diameter of not greater than 5 mm (for example, 1.5 to 4 mm) for use in a small hard disk drive mechanism, the rolling granulation process can impart to a green body an enhanced relative density of not lower than 61%. The thus-manufactured small diameter ball can easily achieve a requirement for a maximum pore size of not greater than 3 $\mu$m, or even a requirement for a maximum pore size of not greater than 1 $\mu$m, which is hardly achieved by those manufactured by the conventional method. Thus, the life of the bearing ball is increased. Furthermore, even when such a pore is exposed on the surface of the ball to become an open pore, the generation of noise or vibration caused by such an open pore can be suppressed to a sufficiently low level in application to a bearing.

An inner ring and an outer ring can be made of steel having an Ni content of not greater than 3% by weight (including 0% by weight), such as high-carbon chromium bearing steel (for example, SUJ1, SUJ2, or SUJ3 prescribed in JIS-G4805(1990)) or martensitic stainless steel (for example, SUS440). When a zirconia containing ceramic ball is to be used with the inner and outer rings as a bearing ball (rolling element), the composition of zirconia containing ceramic (constituent ceramic) of the ball is desirably adjusted such that the average thermal expansion coefficient at 20 to 100° C. becomes 6 to 9×10$^{-6}$/° C. Thus, the constituent ceramic of the bearing ball can assume a coefficient of linear expansion close to that, approximately 8×10$^{-6}$/° C., of the above steel which the inner or outer ring is made of. When a bearing is applied to high-speed rotation, the bearing temperature rises to approximately 80° C. due to heat induced by sliding. If a large difference exists in thermal expansion coefficient between the constituent ceramic of the ball and the steel which the inner or outer ring is made of, the clearance between the ball and the inner/outer ring increases, with a resultant impairment in rotational precision of the bearing. However, this problem can be effectively prevented through the above adjustment of the thermal expansion coefficient of the constituent ceramic of the ball.

When the zirconia containing ceramic ball of the present invention is used as a bearing ball, preferably, the surface of the ball is polished so as to assume a sphericity of not greater than 0.08 $\mu$m. Also, preferably, the arithmetic average roughness Ra of the polished surface is not greater than 0.012 $\mu$m. Still preferably, the cumulative area percentage of open pores each having a size of not less than 1 $\mu$m as observed on the polished surface is not greater than 1%, or the average number of the open pores present in a unit area of 1 mm² is not greater than 500.

Herein, the arithmetic average roughness Ra is measured by the method prescribed in JIS B0601 (1994). According to the standard, when the arithmetic average roughness Ra is not greater than 0.012 μm, the cutoff value is 0.08 mm, and the standard evaluation length is 0.4 mm. The size of an open pore observed on the polished surface is defined in a manner similar to that for the size of a pore in the surface layer region.

Through attainment of a sphericity of not greater than 0.08 μm while the cumulative area percentage of open pores each having a size of not less than 1 μm as observed on the polished surface is not greater than 1%, or the average number of the open pores present in a unit area of 1 mm² is not greater than 500, a ceramic ball serving as a bearing ball yields the following advantages when a bearing using the ceramic balls is applied to, for example, precision electronic equipment, such as a hard disk drive of a computer. Even when the bearing is applied to high-speed rotation (for example, 5400 to 15,000 rpm), generation of noise or vibration can be effectively prevented or suppressed, and the bearing balls can exhibit long life. Also, in cooperation with attainment of the above sphericity or attainment of the above cumulative area percentage of open pores and/or the above average number of existing open pores, attainment of an arithmetic average roughness Ra of not greater than 0.012 μm with respect to the polished surface can far more effectively prevent generation of noise or vibration.

When a ceramic ball has a sphericity in excess of 0.08 μm or an arithmetic average roughness Ra in excess of 0.012 μm as measured on the polished surface, a ball bearing using the ceramic balls tends to suffer vibration or noise. More preferably, the sphericity is not greater than 0.03 μm, and the arithmetic average roughness Ra of the polished surface is not greater than 0.01 μm. For the same reason as in the case of sphericity, diametral irregularity among balls is not greater than 0.10 μm, preferably not greater than 0.07 μm.

When the cumulative area percentage of open pores each having a size of not less than 1 μm as observed on the polished surface is in excess of 1%, or the average number of the open pores present in a unit area of 1 mm² is in excess of 500, even though the arithmetic average roughness Ra of the polished surface is not greater than 0.012 μm, a ball bearing using the ceramic balls tends to suffer vibration or noise.

The zirconia containing ceramic ball of the present invention can be used in a check valve. Specifically, the check valve comprises a valve body having a fluid path formed therein and a ball disposed within the fluid path so as to limit fluid flow within the fluid path to a single direction. The ball is the zirconia containing ceramic ball of the present invention. Since the zirconia containing ceramic ball features a maximum pore size of not greater than 3 μm by virtue of manufacture through rolling granulation, the ball exhibits enhanced durability, thus realizing a check valve of long life.

In manufacture of a ceramic ball for use in a check valve, the conventional method has encountered difficulty in sufficiently reducing the maximum pore size. The effect of the present invention is far more noticeable in manufacture of a ceramic ball having a diameter of not greater than 12 mm, even not greater than 5 mm.

Embodiments of the present invention will be described, first, with reference to a ceramic ball for use in a bearing. Material for the ball is a zirconia powder which contains a stabilizing component (for example, $Y_2O_3$), such as CaO, $Y_2O_3$, or MgO in an amount of 1.4 to 4 mol %. The zirconia powder may be powder of a zirconia solid solution containing a stabilizing component. In the latter case, the stabilizing component diffuses into zirconia during firing to the thereby form the zirconia ceramic phase or a mixture of zirconia powder containing no stabilizing component and poweder of a stabilizing component.

Figure 8:
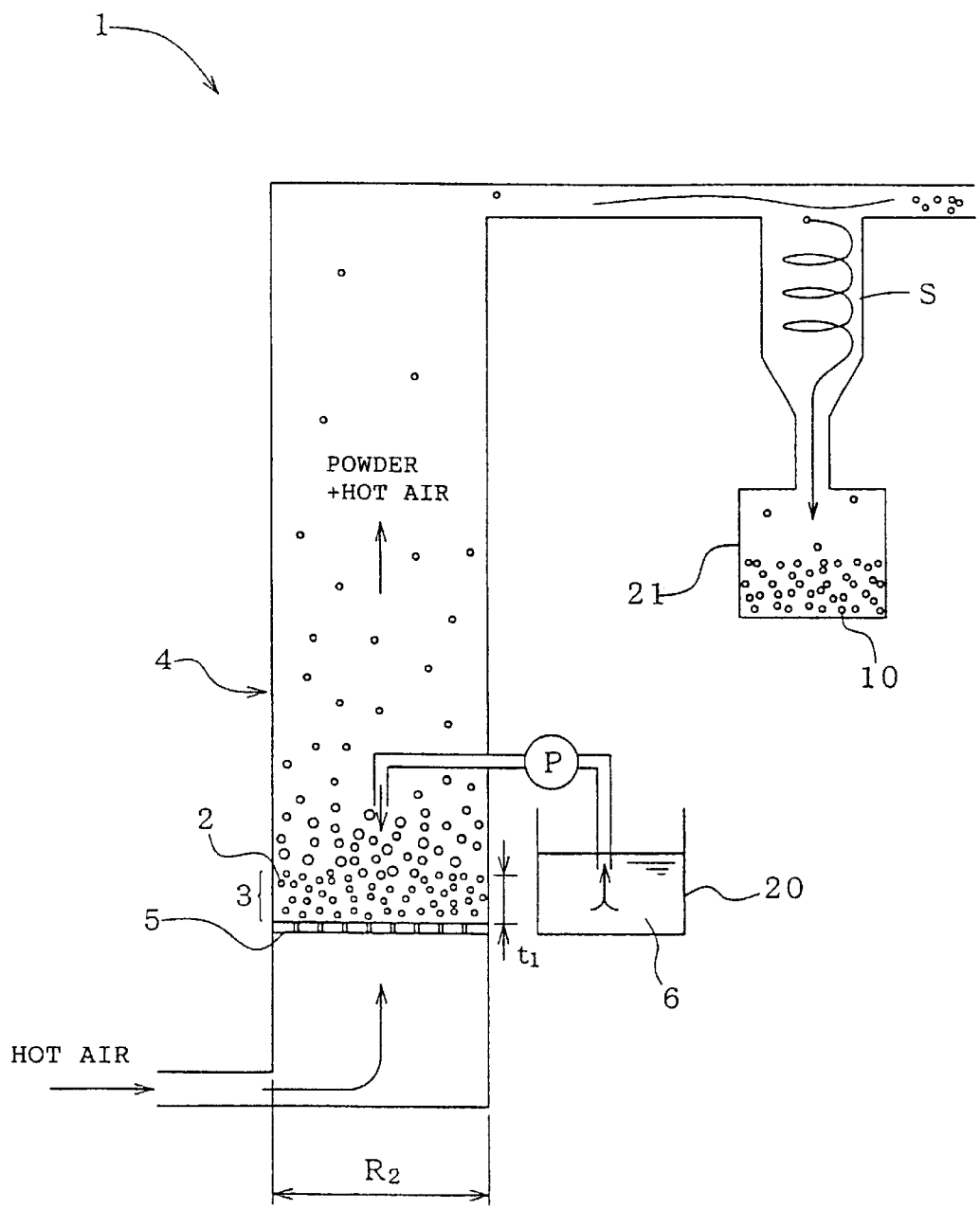
FIG. 8 is a diagrammatic, longitudinal, full sectional view showing an example of apparatus for manufacturing forming material powder.

A method for preparing a forming material powder and a method for forming a green body from the forming material powder will be described. However, the present invention is not limited thereto. FIG. 8 shows an embodiment of an apparatus used in a process for preparing the forming material powder. In the apparatus, a hot air passage 1 includes a vertically disposed hot air duct 4. The hot air duct 4 includes a drying media holder 5, which is located at an intermediate position of the hot air duct 4 and which includes a gas pass body, such as mesh or a plate having through-holes formed therein, adapted to permit passage of hot air and adapted not to permit passage of drying media 2. The drying media 2 are each composed of a ceramic ball, which is formed predominantly of alumina, zirconia, or a mixture thereof. The drying media 2 aggregate on the drying media holder 5 to form a layer of drying media aggregate 3.

Material is prepared in the form of a slurry which, in turn, is prepared in the following manner. An aqueous solvent is added to a zirconia powder. The resultant mixture is wet mixed (or wet mixed and pulverized) by use of a ball mill or attriter, thereby yielding the slurry. Notably, the grain size of a primary particle is adjusted such that the BET specific surface area of a primary particle becomes 5–13 m²/g.

Figure 9:
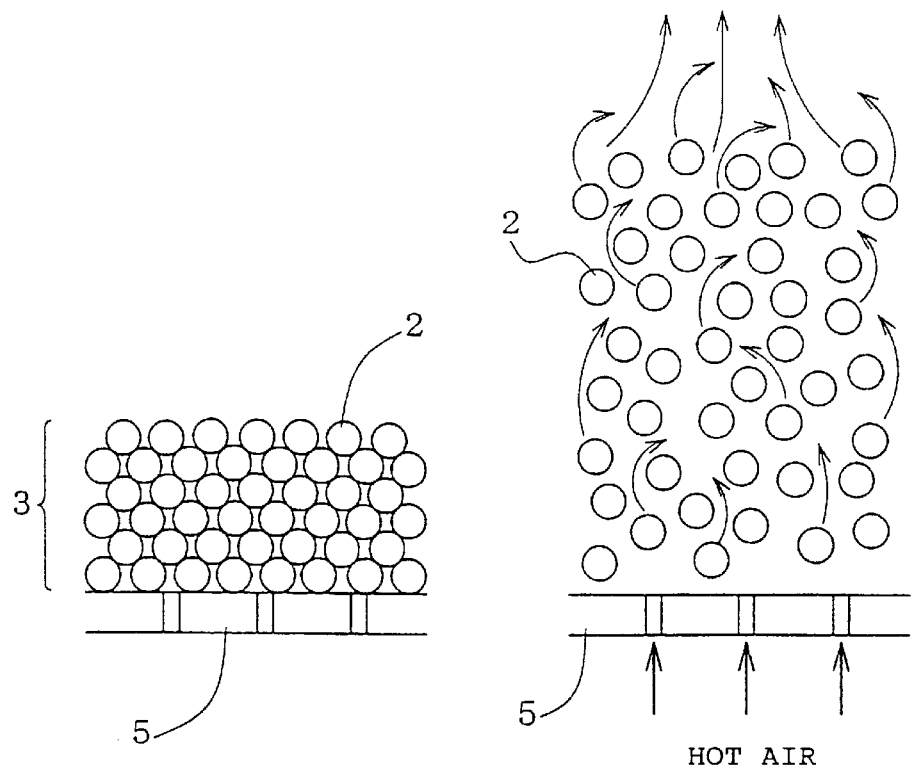
FIG. 9 presents two diagrammatic views showing the action of the apparatus of FIG. 8.
Figure 10:
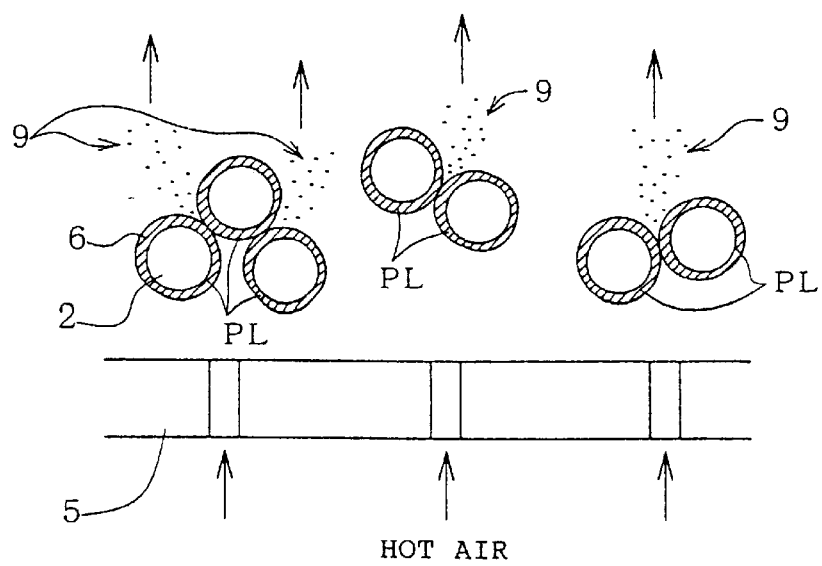
FIG. 10 is a diagrammatic view showing action subsequent to that of FIG. 9.

As shown in FIG. 9, hot air is caused to flow through the drying media aggregate 3 from underneath the drying media holder 5 and to flow upward through the hot air duct 4 while agitating the drying media 2. As shown in FIG. 8, a pump P pumps up a slurry 6 from a slurry tank 20. The slurry 6 is fed to the drying media aggregate 3 from above and through effect of gravity. As shown in FIG. 10, the slurry 6 adheres to the surfaces of the drying media 2 while being dried by hot air, thereby forming a powder aggregate layer PL on the surface of each drying medium 2.

The flow of hot air causes repeated agitation and fall of the drying media 2. Thus, the individual pieces of drying media 2 collide and rub against one another, whereby the powder aggregate layers PL are pulverized into forming material powder particles 9. Some of the forming material powder particles 9 assume the form of a solitary primary particle, but most of the forming material powder particles 9 assume the form of a secondary particle, which is the aggregation of primary particles. The forming material powder particles 9 having a grain size not greater than a certain value are conveyed downstream by hot air (FIG. 8). The forming material powder particles 9 having a grain size greater than a certain value are not blown by hot air, but again fall onto the drying media aggregate 3, thereby undergoing further pulverization effected by the drying media 2.

The forming material powder particles 9 conveyed downstream by hot air pass through a cyclone S and are then collected as forming material powder 10 in a collector 21. The collected forming material powder 10 is prepared so as to have an average grain size of 0.3 to 2 μm and a 90% grain size of 0.7 to 3.5 μm as measured by use of a laser diffraction granulometer, as well as a BET specific surface area of 5 to 13 m²/g.

In FIG. 8, the diameter of the drying medium 2 is determined as appropriate according to the cross-sectional area of the hot air duct 4. If the diameter of the drying medium 2 is insufficient, a sufficiently large impact force will not be exerted on the powder aggregate layers PL formed on the drying media 2. As a result, the forming material powder 10 may fail to have a predetermined grain size. If the diameter of the drying medium 2 is excessively large, the flow of hot air will encounter difficulty in agitating the drying media 2, again causing poor impact force. As a result, the forming material powder 10 may fail to have a predetermined grain size. Preferably, the drying media 2 are substantially uniform in diameter so as to leave an appropriate space thereamong, whereby the motion of the drying media 2 is accelerated during flow of hot air.

A thickness t1 of the drying media 2 of the drying media aggregate 3 is determined such that the drying media 2 move appropriately according to the velocity of hot air. If the thickness t1 is excessively large, the drying media 2 will encounter difficulty in moving, causing poor impact force. As a result, the forming material powder 10 may fail to have a predetermined grain size. If the thickness t1; i.e., the amount of the drying media 2, is excessively small, the drying media 2 will collide less frequently, resulting in impaired processing efficiency.

The temperature of hot air is determined such that the slurry 6 is dried sufficiently and the forming material powder 10 does not suffer any problem, such as thermal deterioration. For example, when a solvent used for preparation of the slurry 6 is composed predominantly of water, hot air having a temperature lower than 100° C. fails to sufficiently dry the fed slurry 6. The resultant forming material powder 10 has an excessively high water content and thus tends to agglomerate. As a result, the forming material powder 10 may fail to have a predetermined grain size.

The velocity of hot air is determined so as not to cause the drying media 2 to fly into the collector 21. If the velocity is excessively low, the drying media 2 will encounter difficulty in moving, resulting in poor impact force. As a result, the forming material powder 10 may fail to have a predetermined grain size. If the velocity is excessively high, the drying media 2 will fly too high, causing reduced frequency of collision. As a result, processing efficiency will decrease.

Figure 2:
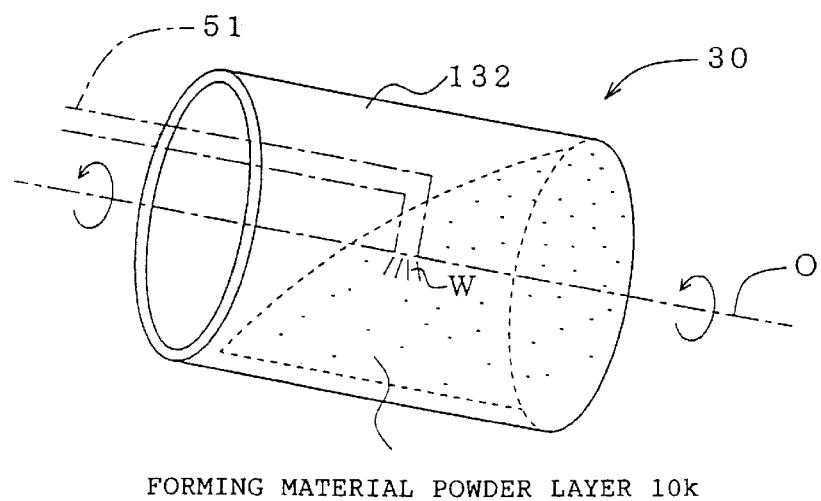
FIG. 2 is a diagrammatic view showing a step of rolling granulation subsequent to the step of FIG. 1.
Figure 5:
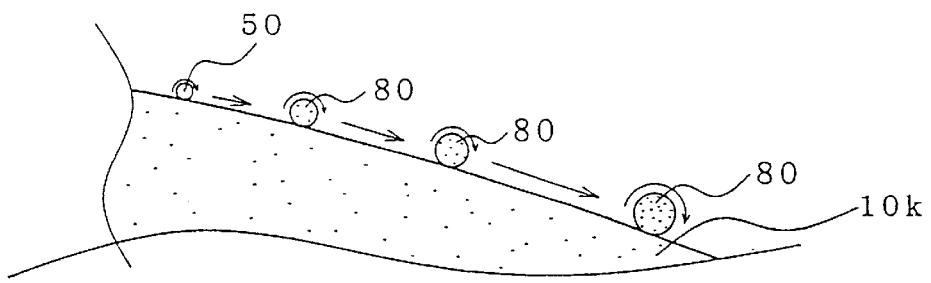
FIGS. 5(a), 5(b), 5(c), 5(d) and 5(e) are diagrammatic views showing a rolling granulation process, depicting the progress of rolling granulation.
Figure 5:
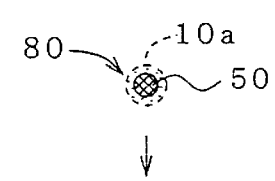
Figure 5:
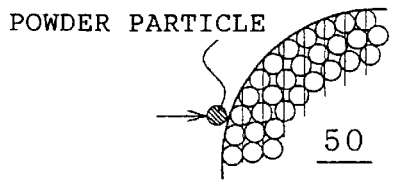
Figure 5:
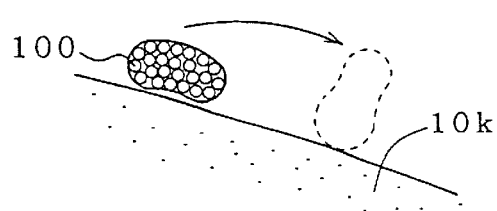
Figure 5:
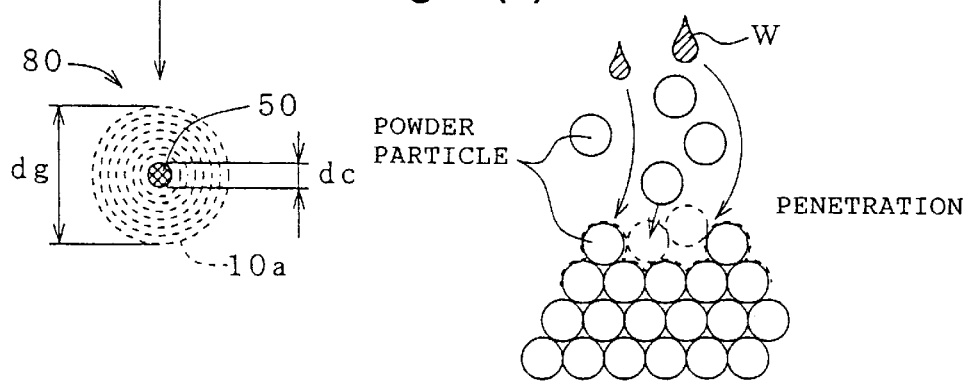

The thus-obtained forming material powder 10 can be formed into spherical bodies by means of the rolling granulation process. Specifically, as shown in FIG. 1, the forming material powder 10 is placed in a granulation container 132. As shown in FIG. 2, the granulation container 132 is rotated at a constant peripheral speed. Water W is fed to the forming material powder 10 contained in the granulation container 132, through, for example, spraying. As shown in FIG. 5, the charged forming material powder 10 rolls down an inclined powder layer 10k formed in the rotating granulation container 132 to thereby spherically aggregate into a green body 80. The operating conditions of a rolling granulation apparatus 30 are adjusted such that the obtained green body 80 assumes a relative density of not lower than 61%. Specifically, the rotational speed of the granulation container 132 is adjusted to 10 to 200 rpm. The water feed rate is adjusted such that the finally obtained green body 80 assumes a water content of 10 to 20% by weight. Through use of the forming material powder 10 which contains the aforementioned sintering aid powder in an amount of 1 to 10% by weight and through rolling granulation of the forming material powder 10 under the above conditions, the obtained green body 80 can assume a relative density of not lower than 61%.

Figure 6:
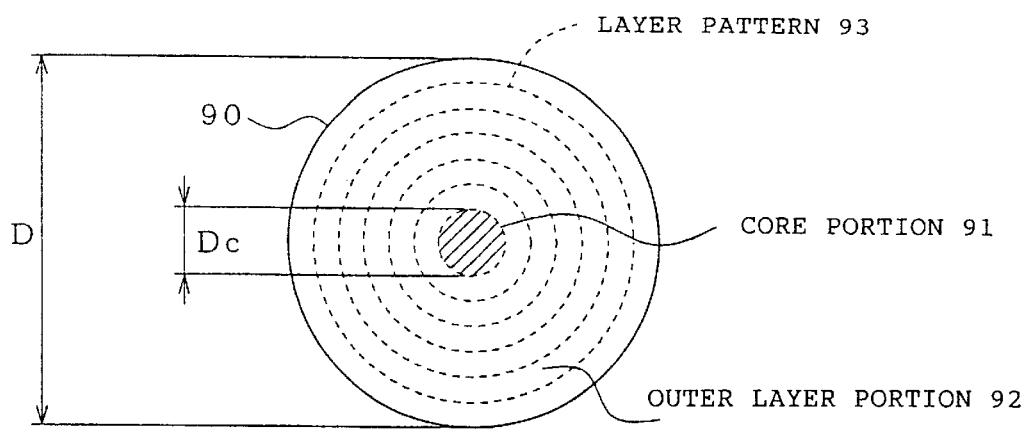
FIG. 6 is a schematic view showing the cross-sectional structure of a spherical ceramic sintered body manufactured through rolling granulation.

In order to accelerate the growth of the green body 80 during rolling granulation, as shown in FIG. 1, preferably, forming nuclei 50 are placed in the granulation container 132. While the forming nucleus 50 is rolling down the forming material powder layer 10k as shown in FIG. 5(a), the forming material powder 10 adheres to and aggregates on the forming nucleus 50 spherically, as shown in FIG. 5(b), to thereby form the spherical green body 80 (rolling granulation process). The green body 80 is sintered to thereby become an unfinished bearing ball 90 as shown in FIG. 6.

Preferably, the forming nucleus 50 is formed predominantly of ceramic powder as represented by a forming nucleus 50a shown in FIG. 3(a); for example, the forming nucleus 50 is formed of a material having composition similar to that of the forming material powder 10 (however, a ceramic powder different from the ceramic powder (inorganic material powder) constituting predominantly the forming material powder 10 may be used). This is because the nucleus 50a is unlikely to act as an impurity source on the finally obtained ceramic ball 90. However, when there is no possibility of a nucleus component diffusing to a surface layer portion of the ceramic ball 90, the nucleus 50 may be formed of a ceramic powder different from the ceramic powder (inorganic material powder) constituting predominantly the forming material powder 10; alternatively, the nucleus 50 may be a metal nucleus 50d shown in FIG. 3(d) or a glass nucleus 50e shown in FIG. 3(e). Also, the nucleus 50 may be formed of a material which disappears through thermal decomposition or evaporation during firing; for example, the nucleus 50 may be formed of a polymeric material, such as wax or resin. The forming nucleus 50 may assume a shape other than sphere, as shown in FIG. 3(b) or 3(c). Preferably, the forming nucleus 50 assumes a spherical shape, as shown in FIG. 3(a), in order to enhance the sphericity of a green body to be obtained.

Figure 4:
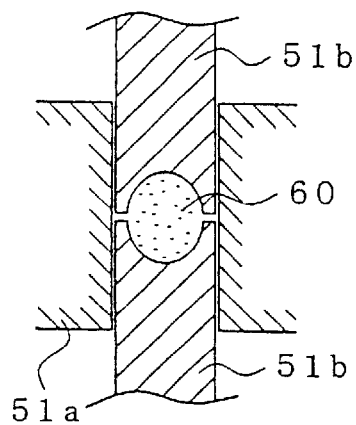
FIGS. 4(a), 4(b), 4(c), 4(d) and 4(e) are diagrammatic views showing several examples of a method for manufacturing a green body.
Figure 4:
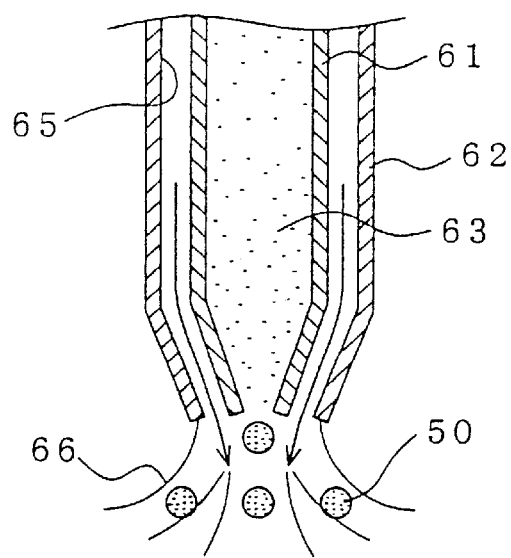
Figure 4:
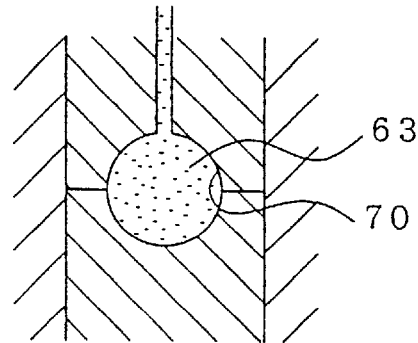
Figure 4:
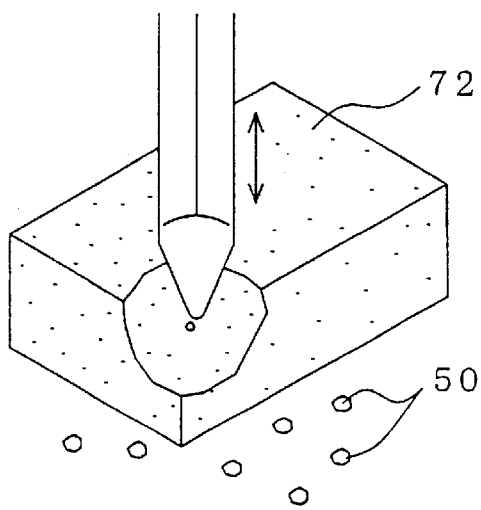
Figure 4:
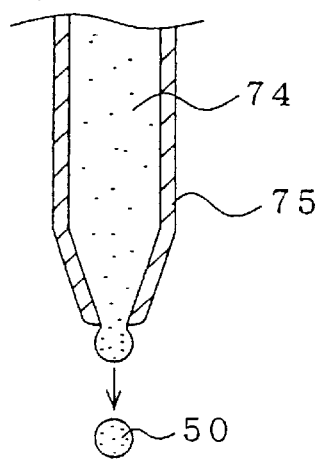

A method for manufacturing the forming nuclei 50 is not particularly limited. When the forming nuclei 50 are composed predominantly of ceramic powder, for example, various methods as shown in FIG. 4 can be employed. According to the method shown in FIG. 4(a), a ceramic powder 60 is compacted by means of a die 51a and press punches 51b (other compression means may be used instead), thereby obtaining the nucleus 50. According to the method shown in FIG. 4(b), ceramic powder is dispersed into a molten thermoplastic binder to obtain a molten compound 63, and the thus-obtained molten compound 63 is sprayed and solidified, thereby obtaining the nuclei 50. According to the method shown in FIG. 4(c), the molten compound 63 is injected into a spherical cavity formed in an injection mold, thereby molding the spherical nucleus 50. According to the method shown in FIG. 4(e), the molten compound 63 is caused to fall freely from a nozzle so as to assume a spherical shape by means of surface tension effect, and the thus-formed spherical droplet is cooled and solidified in the air to become the nucleus 50.

Alternatively, slurry is formed from material powder, a monomer (or a prepolymer) and a dispersant solvent. The slurry is dispersed in a liquid which does not mix with the slurry, so as to assume the form of globules in the liquid. Then, the monomer or prepolymer is polymerized, thereby obtaining spherical bodies, which serve as the nucleus 50. Alternatively, the forming material powder 10 is singly placed in the granulation container 132 and the granulation container 132 is rotated at a speed lower than that for growing the green body 80 (see FIG. 2), so as to form powder aggregates. When powder aggregates of sufficiently large size are generated in a sufficient amount, the rotational speed of the aggregation container 132 is increased to thereby grow the green bodies 80 while utilizing the aggregates as the nuclei 50. In this case, there is no need to place the nuclei 50 manufactured in a separate process, in the granulation container 132 together with the forming material powder 10.

The thus-obtained forming nucleus 50 does not collapse and can stably maintain the shape even when some external force is imposed thereon. Thus, when the nucleus 50 rolls down the forming material powder layer 10k as shown in FIG. 5(a), the nucleus 50 can reliably sustain reaction induced from its own weight. Conceivably, since powder particles which are caught on the rolling nucleus 50 can be firmly pressed on the surface of the nucleus 50 as shown in FIG. 5(e), the powder particles are appropriately compressed to thereby grow into a highly dense aggregate layer 10a. Notably, rolling granulation can be performed without use of nuclei. As shown in FIG. 5(d), since an aggregate 100 corresponding to a nucleus is rather loose and soft at the initial stage of formation, lowering the rotational speed of the granulation container 132 is preferable in order to prevent occurrence of defect.

The size of the nucleus 50 is at least approximately 40 μm (preferably, approximately 80 μm). When the nucleus 50 is too small, the growth of the aggregate layer 10a may become incomplete. When the nucleus 50 is too large, the thickness of the aggregate layer 10a to be formed becomes insufficient; as a result, a sintered body tends to suffer occurrence of defect. Preferably, the size of the nucleus 50 is, for example, not greater than 1 mm.

Preferably, the forming nucleus 50 assumes the form of an aggregate of ceramic powder having a density higher than the bulk density (for example, apparent density prescribed in JIS Z2504 (1979)) of the forming material powder 10. Such an aggregate of ceramic powder can reliably sustain the pressing force of powder particles to thereby accelerate the growth of the aggregate layer 10a. Specifically, an aggregate of ceramic powder having a density at least 1.5 times the bulk density of the forming material powder 10 is preferred. In this case, sufficient aggregation is such that, when an aggregate rolls down the forming material powder layer 10k, the aggregate does not collapse from the shock of rolling.

In order to grow the green body 80 more stably, preferably, the size of the nucleus 50 is determined according to the size of the green body 80 in the following manner. As shown in FIG. 5(b), the size of the forming nucleus 50 is represented by the diameter dc of a sphere having a volume equal to that of the nucleus 50 (when the nucleus 50 is spherical, the diameter thereof is the size in question), and the diameter of the finally obtained spherical green body 80 is represented by dg. The diameter dc is determined such that dc/dg is 1/100–1/2. When dc/dg is less than 1/100, the nucleus 50 becomes too small, potentially causing insufficient growth of the aggregate layer 10a or occurrence of many pores in the aggregate layer 10a. When dc/dg is in excess of 1/2, and the density of the nucleus 50 is not sufficiently high, the strength of a sintered body to be obtained may become insufficient. The ratio dc/dg is preferably 1/50 to 1/5, more preferably 1/20 to 1/10. The size dc of the forming nucleus 50 is preferably 20 to 200 times the average grain size of the forming material powder 10. Preferably, the absolute value of the size dc is, for example, 50 to 500 μm.

For example, the green body 80 is sintered by the method to be described later, to thereby obtain an unfinished ceramic ball (hereinafter, called merely an unfinished ball). Conventionally, HIP is often employed in firing for manufacture of zirconia ceramic. However, the green body 80 manufactured by the rolling granulation process can be sintered to a highly dense sintered body even by means of the atmospheric sintering process, for the following reason. Since the relative density of the green body 80 is enhanced to not lower than 61%, and the forming material powder 10 uniformly adheres to and aggregates on the nucleus 50, the green body 80 hardly suffers locally formed large pores. In this case, atmospheric sintering can be performed in the atmosphere, a vacuum, or an inert gas atmosphere. Sintering temperature is 1300° to 1900° C., preferably 1400° to 1600° C. Needless to say, the HIP process can be employed. HIP is performed in an inert gas atmosphere having a pressure of 1000 to 2000 atmospheres at a temperature of 1400° to 1600° C., preferably 1500° to 1600° C. In this case, two-stage firing is effective for attaining high density and reducing the maximum pore size. Specifically, a presintered body having an enhanced relative density of not lower than 95% is manufactured through atmospheric sintering. Then, the presintered body undergoes HIP.

As a result of using the green body 80 manufactured by the aforementioned rolling granulation process, the unfinished ball 90 obtained through sintering of the green body 80 exhibits the feature that the size of the largest pore formed in the surface layer region extending radially from the surface of the ball 90 to a depth of 50 μm as observed on a polished cross section of the ball 90 taken substantially across the center of the ball 90 can be reduced to not greater than 3 μm when atmospheric sintering is employed, and can be reduced to not greater than 1 μm when HIP is employed. Since the green body 80 is highly dense, a sintered body obtained through sintering of the green body 80 becomes highly dense. Thus, pores, become unlikely to remain in a surface layer portion of the unfinished ball 90. The unfinished ball 90 undergoes rough polishing for dimensional adjustment and then undergoes fine polishing, which is performed by use of stationary abrasive grains. Thus is obtained the ceramic ball of the present invention. The ceramic ball can assume the feature that the cumulative area percentage of pores each having a size of not less than 1 μm as observed on the polished surface is not greater than 1% and that the average number of the pores present in a unit area of 1 mm$^2$ on the polished surface is not greater than 500. Also, the ceramic ball can assume an arithmetic average roughness Ra of not greater than 0.012 μm as observed on the polished surface, and a sphericity of not greater than 0.08 μm. Furthermore, diametral irregularity among the ceramic balls can be not greater than 0.10 μm.

The unfinished ball 90 obtained through firing of the spherical green body 80 which, in turn, is obtained by means of the rolling granulation process has the structure shown in FIG. 6, which is an enlarged schematic view showing a polished cross section taken substantially across the center of the ball 90. Specifically, a core portion 91 derived from the forming nucleus 50 is formed at a central portion of the unfinished ball 90 distinguishably from an outer layer portion 92, which is derived from the aggregate layer 10a and features high density and few pores. In many cases, the core portion 91 exhibits a visually distinguishable contrast with the outer layer portion 92 with respect to at least brightness or color tone. Conceivably, such contrast is exhibited because of difference between ceramic density pe of the outer layer portion 92 and ceramic density pc of the core portion 91. For example, when the forming nucleus 50 (FIG. 5) is lower in density than the aggregate layer 10a, the ceramic density pe of the outer layer portion 92 becomes higher than the ceramic density pc of the core portion 91 in many cases. As a result, the color tone of the outer layer portion 92 becomes brighter than that of the core portion 91. In view of attainment of appropriate strength and durability of ceramic, the relative density of the outer layer portion 92 is not lower than 99%, preferably not lower than 99.5%. In any case, through attainment of such a sintered-body structure that the above-mentioned structural feature appears on a polished cross section, there can be realized a spherical ceramic sintered body featuring high density, high strength, and low fraction defective (for example, to such an extent that no pore is observed) at the surface layer portion 92, which is a key to enhancement of performance of, for example, a bearing. In the case where firing has proceeded uniformly, a resultant sintered body may exhibit substantially uniform density in a radial direction from a surface layer portion to a central portion. Alternatively, even when the core portion 91 and the outer layer portion 92 differ in color tone or brightness, almost no difference may exist in density therebetween. In the case where firing has proceeded in a highly uniform manner, concentric contrast patterns may not be visually observed at the core portion 91 or at the outer layer portion 92.

When dc/D is adjusted to $\frac{1}{100}$ to $\frac{1}{2}$ (preferably $\frac{1}{50}$ to $\frac{1}{5}$, mor preferably $\frac{1}{20}$ to $\frac{1}{5}$), where, as shown in FIG. 5(b), dc is the diameter of the forming nucleus, and D is the diameter of an unfinished ball obtained through firing, the cross section of the sintered body 90 shown in FIG. 6 assumes such a structure that Dc/D is $\frac{1}{100}$ to $\frac{1}{2}$ (preferably $\frac{1}{50}$ to $\frac{1}{5}$, more pre $\frac{1}{10}$), where Dc is the diameter of a circle having an area equal to that of the core portion 91 (when the nucleus 50 is formed of a material which disappears through thermal decomposition or evaporation during firing; for example, wax, resin, or like polymeric material, the core portion 91 becomes a void portion), and D is the diameter of the ceramic sintered-body. When Dc/D is less than $\frac{1}{50}$, the aggregate layer 10a (FIG. 11), which becomes the outer layer portion 92, tends to suffer occurrence of pores, potentially resulting in insufficient strength. When Dc/D is in excess of $\frac{1}{5}$, and, for example, the density of the nucleus 50 is not very high, the strength of the sintered body may become insufficient. Dc/D is preferably $\frac{1}{20}$ to $\frac{1}{10}$.

Figure 7:
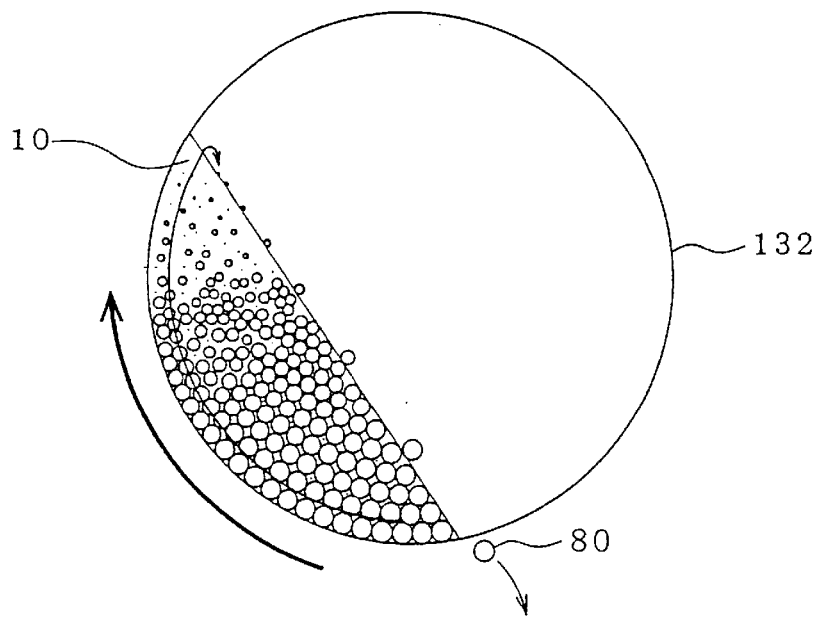
FIG. 7 is a diagrammatic view showing rolling granulation.

An example of visually distinguishable contrast between the core portion 91 and the outer layer portion 92 in the unfinished ball 90 is the state in which brightness or color tone differs in the radial direction of the ball 90 while being unchanged in the circumferential direction. Specifically, a concentric layer pattern is formed in the outer layer portion 92 in such a manner as to surround the core portion 91 as observed on the polished cross section of the unfinished ball 90. This is a typical structural feature (which is applied to a polished ceramic ball accordingly) as observed in employment of the rolling granulation process. Conceivably, the structural feature arises for the following reason. As shown in FIG. 5(a), while the green body 80 is rolling down the forming material powder layer 10k, the aggregate layer 10a grows. However, during rolling granulation, the green body 80 is not always present on the forming material powder layer 10k. That is, as shown in FIG. 7, since the forming material powder 10 slides like an avalanche as the granulation container 132 rotates, the green body 80 which has reached the lower end portion of the slope of the forming material powder layer 10k is caught into the forming material powder layer 10k. Then, the green body 80 is brought up along the wall surface of the granulation container 132 to an upper end portion of the slope of the forming material powder layer 10k. The green body 80 again rolls down the forming material powder layer 10k. When the green body 80 is caught in the forming material powder layer 10k, the green body 80 is pressed by the surrounding forming material powder 10, and is thus less susceptible to impact associated with a rolling-down motion. As a result, powder particles adhere to the green body 80 in a relatively loose manner. By contrast, when the green body 80 rolls down the forming material powder layer 10k, the green body 80 is subjected to impact associated with a rolling-down motion and is susceptible to the spray of liquid spray medium W, such as water. As a result, powder particles adhere to the green body 80 in a relatively tight manner. Since the green body 80 rolls down and is caught into the forming material powder layer 10k cyclically, the state of adhesion of powder varies cyclically. Accordingly, the aggregate layer 10a, which is formed of adhering powder particles, involves repetitions of condensation and rarefaction in the radial direction. Even after sintering, the repetitions of condensation and rarefaction emerge in the form of delicate difference in density, thereby forming a layer pattern 93 (when the difference between condensation and rarefaction is very small, the actual occurrence of condensation and rarefaction may not be observed by means of ordinary density measurement, since the precision of the measurement is not sufficiently high). Conceivably, for example, the layer pattern 93 is composed of concentric spherical portions of different densities, which are alternately arranged in layers.

Figure 13:
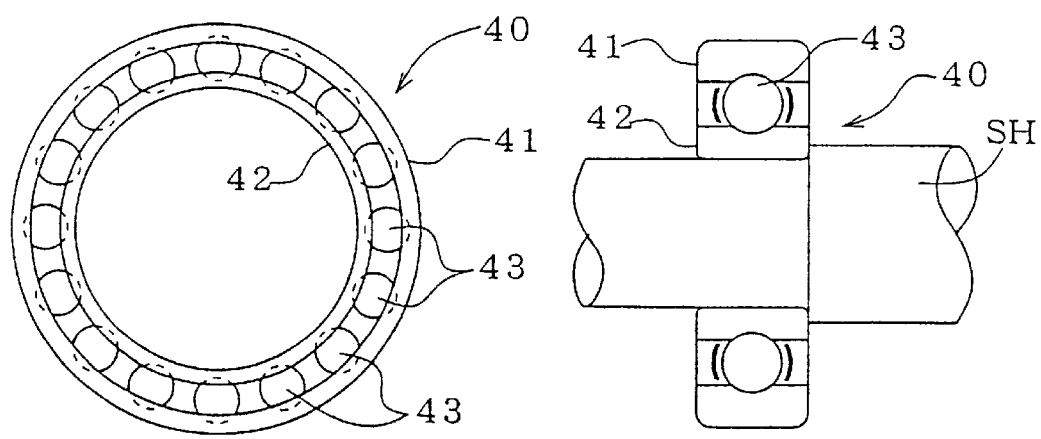
FIG. 13 are front and side elevational views showing a ball bearing incorporating ceramic balls of the present invention.

As shown in FIG. 13, ceramic balls 43 obtained as above are incorporated between an inner ring 42 and an outer ring 41, which are made of, for example, metal or ceramic, thereby yielding a radial ball bearing 40. When a shaft SH is fixedly attached to the internal surface of the inner ring 42 of the ball bearing 40, the ceramic balls 43 are supported rotatably or slidably with respect to the outer ring 41 or the inner ring 42. Through attainment of a maximum pore size of not greater than 3 μm, preferably not greater than 1 μm, in the aforementioned surface layer region, the ceramic ball 43 can greatly enhance durability thereof.

Figure 14:
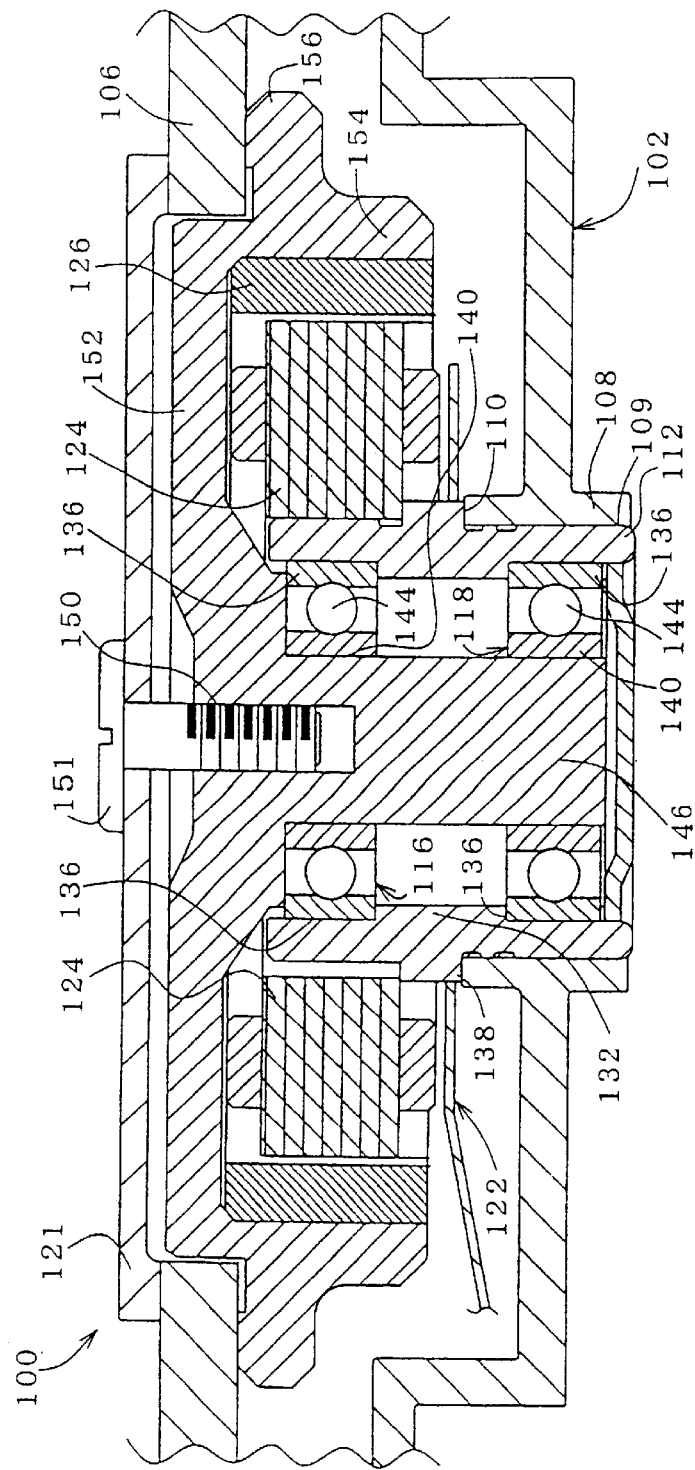
FIG. 14 is a full, sectional view of a hard disk drive mechanism for computer use incorporating the ball bearing of FIG. 13.

FIG. 14 is a longitudinal sectional view showing an example of configuration of a hard disk drive using the above-mentioned ball bearing. The hard disk drive 100 includes a body casing 102; a cylindrical shaft holder portion 108 formed at the center of the bottom of the body casing 102 in a vertically standing condition and a cylindrical bearing holder bushing 112 coaxially fitted to the shaft holder portion 108. The bearing holder bushing 112 has a bushing fixation flange 110 formed on the outer circumferential surface thereof and is axially positioned while the bush fixation flange 110 abuts one end of the shaft holder portion 108. Ball bearings 116 and 118 configured in the same manner as shown in FIG. 13 are coaxially fitted into the bearing holder bushing 112 at the corresponding opposite end portions of the bushing 112 while abutting the corresponding opposite ends of a bearing fixation flange 132 projecting inward from the inner wall of the bearing holder bush 112 to thereby be positioned. The ball bearings 116 and 118 are configured such that a plurality of ceramic balls 144 of the present invention are disposed between an inner ring 140 and an outer ring 142.

A disk-rotating shaft 146 is fixedly fitted into the inner rings 140 of the ball bearings 116 and 118 to thereby be supported by the ball bearings 116 and 118 in a rotatable condition with respect to the bearing holder bush 112 and the body casing 102. A flat, cylindrical disk fixation member (rotational member) 152 is integrally formed at one end of the disk-rotating shaft 146. A wall portion 154 is formed along the outer circumferential eDe of the disk fixation member 152 in a downward extending condition. An exciter permanent magnet 126 is attached to the inner circumferential surface of the wall portion 154. A field coil 124 fixedly attached to the outer circumferential surface of the bearing holder bushing 112 is disposed within the exciter permanent magnet 126 in such a manner as to face the exciter permanent magnet 126. The field coil 124 and the exciter permanent magnet 126 constitute a DC motor 122 for rotating the disk. A disk fixation flange 156 projects outward from the outer circumferential surface of the wall portion 154 of the disk fixation member 152. An inner circumferential eDe portion of a recording hard disk 106 is fixedly held between the disk fixation flange 156 and a presser plate 121. A clamp bolt 151 is screwed into the disk-rotating shaft 146 while extending through the presser plate 121.

When the field coil 124 is energized, the motor 122 starts rotating to thereby generate a rotational drive force while the disk fixation member 152 serves as a rotor. As a result, the hard disk 106 fixedly held by the disk fixation member 152 is rotated about the axis of the disk-rotating shaft 146 supported by the bearings 116 and 118.

Figure 15:
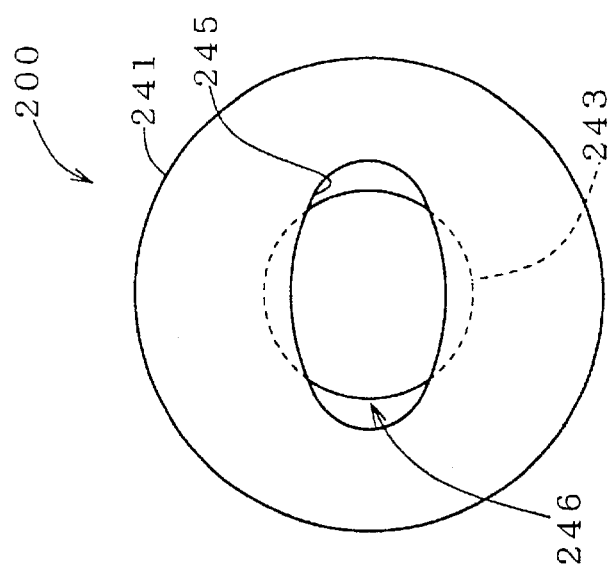
FIG. 15 is a longitudinal sectional view and front view showing an example of a check valve.
Figure 15:
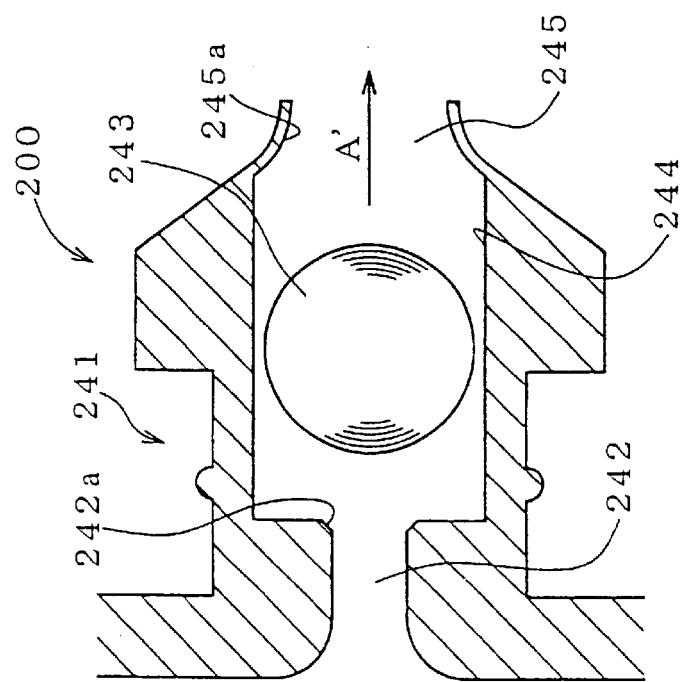

FIG. 15 shows an example of application of the above-mentioned ceramic ball to a check valve. The check valve 200 includes a valve body 241. The valve body 241 internally includes a fluid (for example, liquid) inlet portion 242, a passage chamber 244, and an outlet portion 245, which are arranged in the order to thereby form a fluid path. A ceramic ball 243 is disposed within the passage chamber 244. The passage chamber 244 has a cylindrical wall having a diameter greater than that of the ceramic ball 243. The ceramic ball 243 can axially reciprocate within the passage chamber 244. The inlet portion 242 communicates with the passage chamber 244 and assumes a cylindrical form having a diameter smaller than that of the passage chamber 244. The inlet portion 242 has a taper seat 242a formed at an open end eDe which faces the opening of the passage chamber 244. The outlet portion 245 includes a stopper portion 245a (herein, a tapered reduced diameter portion) adapted to prevent the ceramic ball 243 from moving further in the direction of fluid flow. The outlet portion 245 is formed such that, when the ceramic ball 243 is caught by the stopper portion 245a, a clearance 246 is formed in order to allow fluid to flow therethrough. The surface of the ceramic ball 243 is not required to be finished to as high a finishing accuracy level of the surface of a ceramic bearing ball. A ceramic ball obtained through firing is used as the ceramic ball 243 without being polished or after being briefly polished for dimensional adjustment.

The check valve 200 functions in the following manner. When fluid flows from the inlet portion 242 toward the outlet portion 245, the ceramic ball 243 moves toward the outlet portion 245. Since the ceramic ball 243 is caught by the stopper portion 245a, fluid flows out through the clearance 245. By contrast, when fluid attempts to flow backward from the outlet portion 245 toward the inlet portion 242, the ceramic ball 243 is pushed backward toward the inlet portion 242 and rests on the seat 242a to thereby close the inlet portion 242. As a result, fluid flow is blocked.

Through using as the ceramic ball 243 the zirconia containing ceramic ball of the present invention, which has a maximum pore size of not greater than 3 $\mu$m, the ceramic ball 243 exhibits excellent durability and can maintain long life even when applied to a check valve operating at high speed and high frequency, such as a check valve used in equipment for filling bottles and cans with drink.

Figure 17:
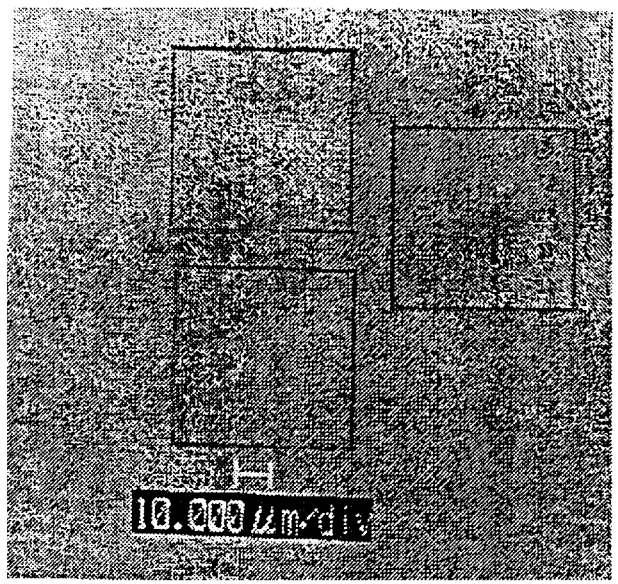
FIGS. 17(a) and 17(b) are images showing the polished cross section of a ball of the Example and a ball of the Comparative Example as observed through an optical microscope.
Figure 17:
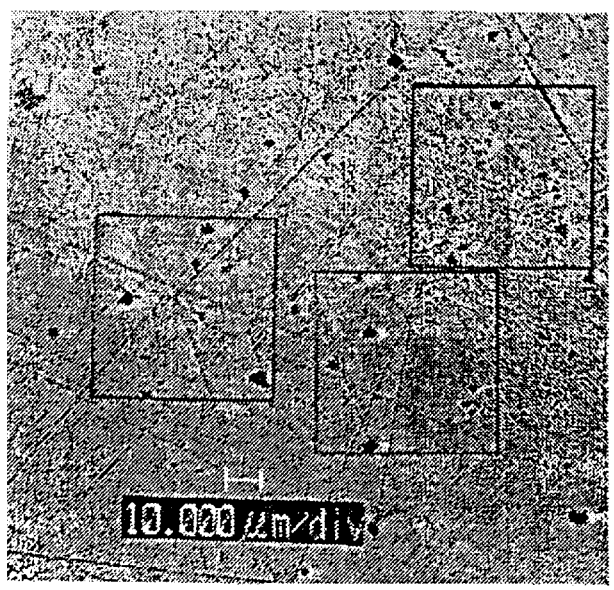

Referring now to FIGS. 17(a) and 17(b), in order to confirm the effect of the present invention, the following experiment was conducted. To produce the balls of the Example illustrated in FIG. 17(a), first, zirconia powder (average grain size 1 $\mu$m, 90% grain size 2.5 $\mu$m, and BET specific surface area 10 m$^2$/g) which contains, as a stabilizing component, yttria in an amount of 4.7% by weight was prepared for use as powder for forming ceramic matrix. To the powder (100 parts by weight), pure water (50 parts by weight) serving as solvent and an organic binder (an appropriate amount) were added. The resulting mixture was mixed for 30 hours by means of an attriter mill, thereby obtaining the slurry of forming material powder. The obtained slurry is formed into forming material powder by use of the apparatus shown in FIG. 8.

The forming material powder was subjected to rolling granulation, thereby manufacturing spherical green bodies each having a diameter of approximately 2.5 mm. For comparison, spherical green bodies were manufactured by means of ordinary pressing, the comparative Example illustrated in FIG. 17(b). The spherical green bodies were subjected to atmospheric firing which was performed in the atmosphere at a temperature of 1500° C. for 5 hours. Some of the fired balls were further subjected to HIP for 2 hours in the argon gas atmosphere having a temperature of 1500° C. and a pressure of 1500 atmospheres. The fired balls were subjected to precision surface polishing so as to attain a sphericity of 0.04 $\mu$m and an arithmetic average roughness of 0.001 $\mu$m, thereby yielding ceramic bearing balls each having a diameter of approximately 2 mm. The bearing balls were disposed between an outer ring of metal and an inner ring of metal to thereby form a bearing as shown in FIG. 13. A microphone (a pickup sensor) was attached to the outer ring. While the outer ring was fixed, the inner ring was rotated at 10,000 rpm to check to see whether abnormal noise is generated. A bearing using these balls generated no abnormal noise, whereas a bearing using the balls of Comparative Example generated abnormal noise.

The balls were each cut along a plane which passes the center of the ball. The cross section was mirror polished and was then observed by means of a scanning electron microscope to thereby measure the size of the largest pore (the maximum pore size) among pores present in the surface layer region extending from the surface of the ball to a depth of 50 $\mu$m. The balls of Example exhibited the following results of measurement: 2.0 $\mu$m for balls obtained merely through atmospheric firing; and 1.2 $\mu$m for balls obtained through HIP. Measurements of the cumulative area percentage of pores each having a size of not less than 1 $\mu$m were as follows: 0.8% for balls obtained merely through atmospheric firing; and 0.5% for balls obtained through HIP. By contrast, the balls of Comparative Example exhibited a maximum pore size of 7 $\mu$m. FIG. 17(a) is an image of the cross section of an HIP-processed ball of Example observed through an optical microscope. FIG. 17(b) is an image of the cross section of a ball of Comparative Example observed through the optical microscope. In the images, a pore appears in the form of a black spot (the square frame represents a region measuring 50 $\mu$m×50 $\mu$m). A number of large pores are observed on the image of Comparative Example in FIG. 17(b), whereas almost no pores are observed on the image of Example in FIG. 17(a).

Obviously, numerous modifications and variations of the present invention are possible in light of the above teachings. It is therefore to be understood that within the scope of the appended claims, the present invention may be practiced otherwise than as specifically described herein.

We claim:

1. A zirconia containing ceramic ball formed of a zirconia containing ceramic material which contains not less than 10% by volume of a zirconia ceramic phase predominantly comprising zirconium oxide, the maximum pore size present in a surface layer region extending radially from the surface of the ball to a depth of 50 μm as observed on a polished cross section of the ball being not greater than 3 μm.

2. The zirconia containing ceramic ball as described in claim 1, wherein the zirconia-containing ceramic ball is adapted to serve as a ceramic ball for use in a bearing.

3. The zirconia containing ceramic ball as described in claim 1, wherein the maximum pore size in the surface layer region is not greater than 2 μm.

4. The zirconia containing ceramic ball as described in claim 3, wherein the cumulative area percentage of pores each having a size of not less than 1 μm as observed in the surface layer region is not greater than 1%.

5. The zirconia containing ceramic ball as described in claim 1, wherein the surface of a zirconia containing ceramic ball is polished so as to assume a sphericity of not greater than 0.08 μm, and an arithmetic average roughness Ra of the polished surface is not greater than 0.012 μm.

6. The zirconia containing ceramic ball as described in claim 1, wherein the zirconia containing ceramic material contains a zirconia ceramic phase in an amount of not less than 60% by volume.

7. A zirconia containing ceramic ball as described in claim 1, wherein the zirconia ceramic phase comprises a cubic system phase and a tetragonal system phase such that the ratio CW/TW is less than 1, where CW is the weight of the cubic system phase and TW is the weight of the tetragonal system phase.

8. A zirconia containing ceramic ball as described in claim 1, wherein the zirconia containing ceramic material is a composite ceramic material comprising the zirconia ceramic phase and a balance ceramic phase predominantly containing alumina and/or an electrically conductive inorganic compound which contains as a metallic cationic component at least one selected from the group consisting of Ti, Zr, Nb, Ta, and W.

9. The zirconia containing ceramic ball as described in claim 1, wherein the zirconia containing ceramic ball is adapted for use in a check valve.

10. The zirconia containing ceramic ball as described in claim 1, wherein the zirconia containing ceramic ball is adapted for use in a bearing.

11. A zirconia containing ceramic ball formed of a zirconia containing ceramic material which contains not less than 60% by volume of a zirconia ceramic phase predominantly comprising zirconium oxide, the maximum pore size present in a surface layer region extending radially from the surface of the ball to a depth of 50 μm as observed on a polished cross section of the ball being not greater than 2 μm.

12. A zirconia containing ceramic ball for a ball bearing assembly formed of a zirconia containing ceramic material which contains not less than 10% by volume of a zirconia ceramic phase predominantly comprising zirconium oxide, the maximum pore size present in a surface layer region extending radially from the surface of the ball to a depth of 50 μm as observed on a polished cross section of the ball being not greater than 2 μm.

13. The zirconia containing ceramic ball as described in claim 12, wherein the surface of a zirconia containing ceramic ball is polished so as to assume a spericity of not greater than 0.08 μm, and an arithmetic average roughness Ra of the polished surface is not greater than 0.012 μm.

14. The zirconia containing ceramic ball as described in claim 12, wherein the zirconia containing ceramic material contains a zirconia ceramic phase in an amount of not less than 60% by volume.

* * * * *

UNITED STATES PATENT AND TRADEMARK OFFICE
CERTIFICATE OF CORRECTION

PATENT NO. : 6,696,376 B2
DATED : February 24, 2004
INVENTOR(S) : Tomonori Niwa et al.

It is certified that error appears in the above-identified patent and that said Letters Patent is hereby corrected as shown below:

Title page,
Item [56], References Cited, insert the following:
-- OTHER DOCUMENTS
The Journal of American Chemical Society, Volumn 57, pages 1754-55 (1935) --.

Column 23,
Line 2, after "zirconium oxide", before "," (comma), insert -- and containing as a stabilizing component, at least one element selected from the group consisting of Ca, Y, Ce, and Mg in a total amount of 1.4 to 4 mol. % on the basis of CaO for Ca, $Y_2O_3$ for Y, $CeO_2$ for Ce, and MgO for Mg --.

Column 24,
Lines 13 and 20, after "zirconium oxide", before "," (comma), insert -- and containing as a stabilizing component, at least one element selected from the group consisting of Ca, Y, Ce, and Mg in a total amount of 1.4 to 4 mol. % on the basis of CaO for Ca, $Y_2O_3$ for Y, $CeO_2$ for Ce, and MgO for Mg --.

Signed and Sealed this

Tenth Day of August, 2004

JON W. DUDAS
*Acting Director of the United States Patent and Trademark Office*